US010670001B2

(12) United States Patent
Pinkerton

(10) Patent No.: US 10,670,001 B2
(45) Date of Patent: Jun. 2, 2020

(54) ENERGY CONVERSION SYSTEM INCLUDING A BALLISTIC RECTIFIER ASSEMBLY AND USES THEREOF

(71) Applicant: Clean Energy Labs, LLC, Austin, TX (US)

(72) Inventor: Joseph F. Pinkerton, Austin, TX (US)

(73) Assignee: Clean Energy Labs, LLC, Austin, TX (US)

( * ) Notice: Subject to any disclaimer, the term of this patent is extended or adjusted under 35 U.S.C. 154(b) by 532 days.

(21) Appl. No.: 15/233,521

(22) Filed: Aug. 10, 2016

(65) Prior Publication Data

US 2016/0348659 A1  Dec. 1, 2016

Related U.S. Application Data

(60) Continuation-in-part of application No. 13/559,416, filed on Jul. 26, 2012, now abandoned, which is a division of application No. 12/438,506, filed as application No. PCT/US2009/034737 on Feb. 20, 2009, now abandoned.

(60) Provisional application No. 61/030,383, filed on Feb. 21, 2008, provisional application No. 61/094,507, filed on Sep. 5, 2008.

(51) Int. Cl.
*F04B 19/00* (2006.01)
*H02N 10/00* (2006.01)
*H02N 3/00* (2006.01)
*H02N 11/00* (2006.01)

(52) U.S. Cl.
CPC ............ *F04B 19/006* (2013.01); *H02N 3/00* (2013.01); *H02N 10/00* (2013.01); *H02N 11/008* (2013.01)

(58) Field of Classification Search
CPC .......... F04B 43/043; H02N 3/00; H02N 10/00
USPC ................... 977/436, 725, 724, 732; 417/436
See application file for complete search history.

(56) References Cited

U.S. PATENT DOCUMENTS 2,443,667 A * 6/1948 Stallmann ................ F04F 9/00
   417/154
2,647,862 A * 8/1953 Whitney .................. B01D 3/10
   202/205

(Continued)

OTHER PUBLICATIONS

Officer Agnes Wittman-Regis; International Preliminary Report on Patentability dated Feb. 21, 2019; PCT/US2017/046328; 11 pages.

*Primary Examiner* — Christopher S Bobish
(74) *Attorney, Agent, or Firm* — Dickinson Wright PLLC; Ross Spencer Garsson

(57) ABSTRACT

Nanomechanical, nanoelectromechanical, and other molecular-scale pump assemblies are described. In certain embodiments, the pump assembly includes a cavity. The cavity includes a plurality of nanofilaments, a surface proximate at least one of the nanofilaments, a fluid flow path, and an opening. Molecules of a fluid that flows from the opening through the cavity along the fluid flow path collide with the surface or one or more of the nanofilaments such that the molecules are accelerated along the fluid flow path. A molecular-scale pump assembly includes a plate defining a plurality of openings, and a plurality of cantilevered molecular-scale beams positioned over each opening. In certain embodiments, molecules of a fluid are accelerated through the opening by asymmetric oscillation and in other embodiments charges are guided along a conductive channel by asymmetric collisions.

18 Claims, 45 Drawing Sheets

(56) References Cited

U.S. PATENT DOCUMENTS

| | | | | |
|---|---|---|---|---|
| 2,905,374 A * | 9/1959 | Scatchard | F04F 9/00 | 417/153 |
| 3,609,593 A * | 9/1971 | Boll | H03H 9/24 | 257/418 |
| 4,023,196 A * | 5/1977 | Kataoka | H01L 47/02 | 257/618 |
| 4,358,302 A * | 11/1982 | Dahneke | H01J 49/067 | 239/424 |
| 4,498,851 A * | 2/1985 | Kolm | F04D 33/00 | 310/331 |
| 4,923,000 A * | 5/1990 | Nelson | F04D 33/00 | 165/122 |
| 6,087,657 A * | 7/2000 | Kato | H01J 49/24 | 250/288 |
| 6,273,687 B1 * | 8/2001 | Nogimori | F04B 43/043 | 417/413.1 |
| 6,343,129 B1 * | 1/2002 | Pelrine | F04B 35/045 | 381/116 |
| 6,422,077 B1 * | 7/2002 | Krauss | G01D 5/30 | 73/105 |
| 6,593,666 B1 * | 7/2003 | Pinkerton | G01K 7/028 | 290/1 R |
| 6,892,525 B2 * | 5/2005 | Guiheen | F02K 9/46 | 60/200.1 |
| 7,001,013 B2 * | 2/2006 | Lewis | B41J 2/14 | 347/55 |
| 7,083,398 B2 * | 8/2006 | Correale | F04B 43/043 | 417/413.3 |
| 7,095,645 B2 * | 8/2006 | Pinkerton | B82Y 10/00 | 365/151 |
| 7,279,247 B2 * | 10/2007 | Matarredona | B01F 3/1242 | 423/445 B |
| 7,518,283 B2 * | 4/2009 | Pinkerton | B81B 3/0018 | 257/415 |
| 7,579,618 B2 * | 8/2009 | Adam | B82Y 10/00 | 257/12 |
| 7,794,611 B2 * | 9/2010 | Scurati | B01L 3/50273 | 216/2 |
| 7,884,525 B2 * | 2/2011 | Culpepper | B81C 99/002 | 310/309 |
| 8,580,658 B1 * | 11/2013 | Davis | H01L 21/0237 | 257/9 |
| 8,740,587 B2 * | 6/2014 | McCauley | F04D 19/042 | 137/565.23 |
| 8,803,340 B2 * | 8/2014 | Moddel | H01L 45/00 | 257/798 |
| 9,257,509 B2 * | 2/2016 | Shepard | H01L 29/1606 | |
| 9,960,026 B1 * | 5/2018 | Hughes | H01J 41/14 | |
| 2002/0043895 A1 * | 4/2002 | Richards | F02B 75/34 | 310/328 |
| 2004/0238907 A1 * | 12/2004 | Pinkerton | B81B 3/0021 | 257/419 |
| 2004/0239119 A1 * | 12/2004 | Pinkerton | H01L 41/1136 | 290/1 R |
| 2004/0239210 A1 * | 12/2004 | Pinkerton | B82Y 10/00 | 310/309 |
| 2004/0253130 A1 * | 12/2004 | Sauciuc | F04D 33/00 | 417/436 |
| 2007/0048160 A1 * | 3/2007 | Pinkerton | B81B 3/0051 | 417/426 |
| 2008/0251865 A1 * | 10/2008 | Pinkerton | H02N 2/18 | 257/414 |
| 2012/0153772 A1 * | 6/2012 | Landa | H02N 11/002 | 310/309 |
| 2014/0034909 A1 * | 2/2014 | Mantese | H01L 37/00 | 257/29 |
| 2016/0016796 A1 * | 1/2016 | Hersam | C04B 35/522 | 423/290 |
| 2016/0284811 A1 * | 9/2016 | Yu | H01L 29/454 | |

\* cited by examiner

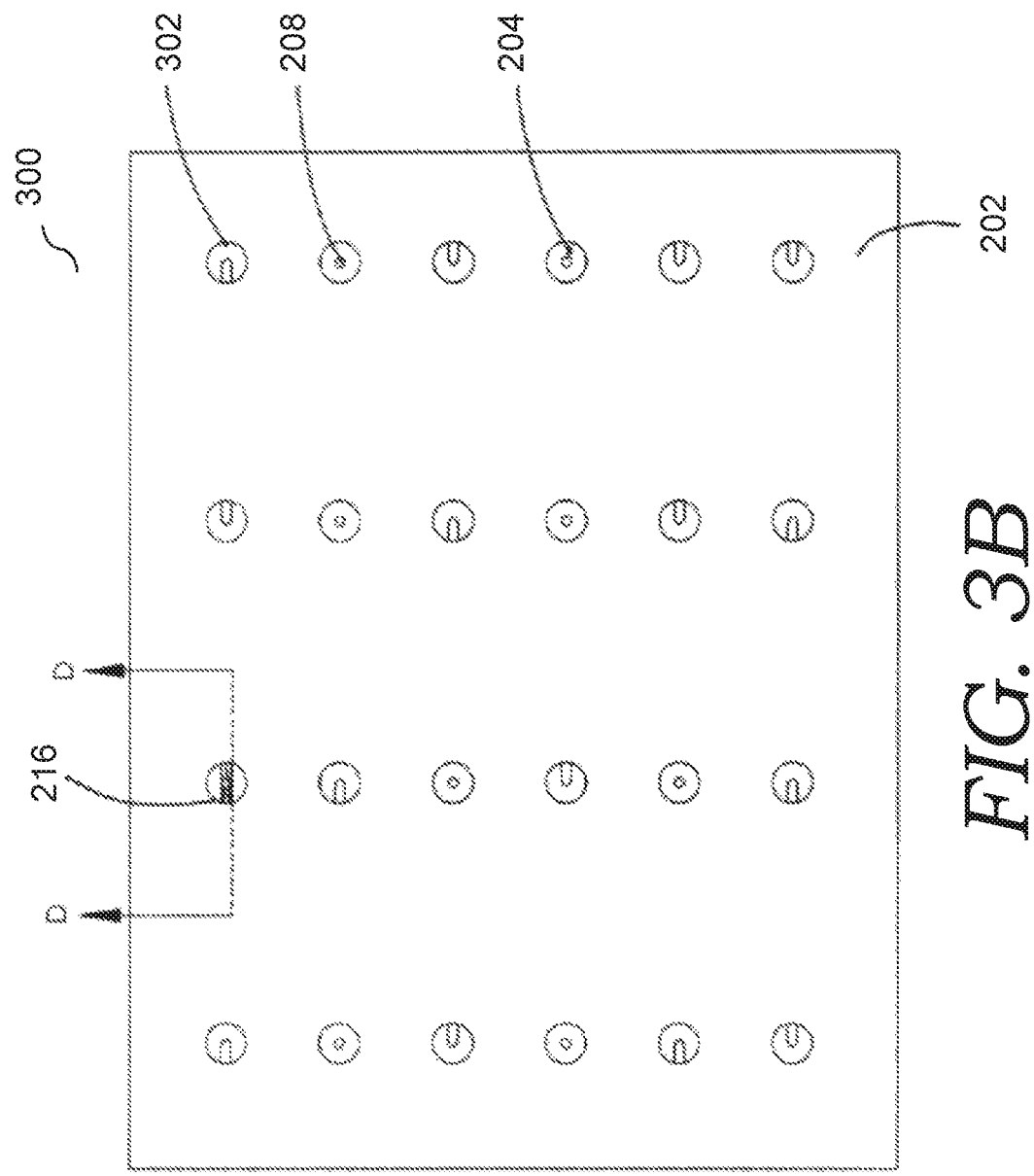

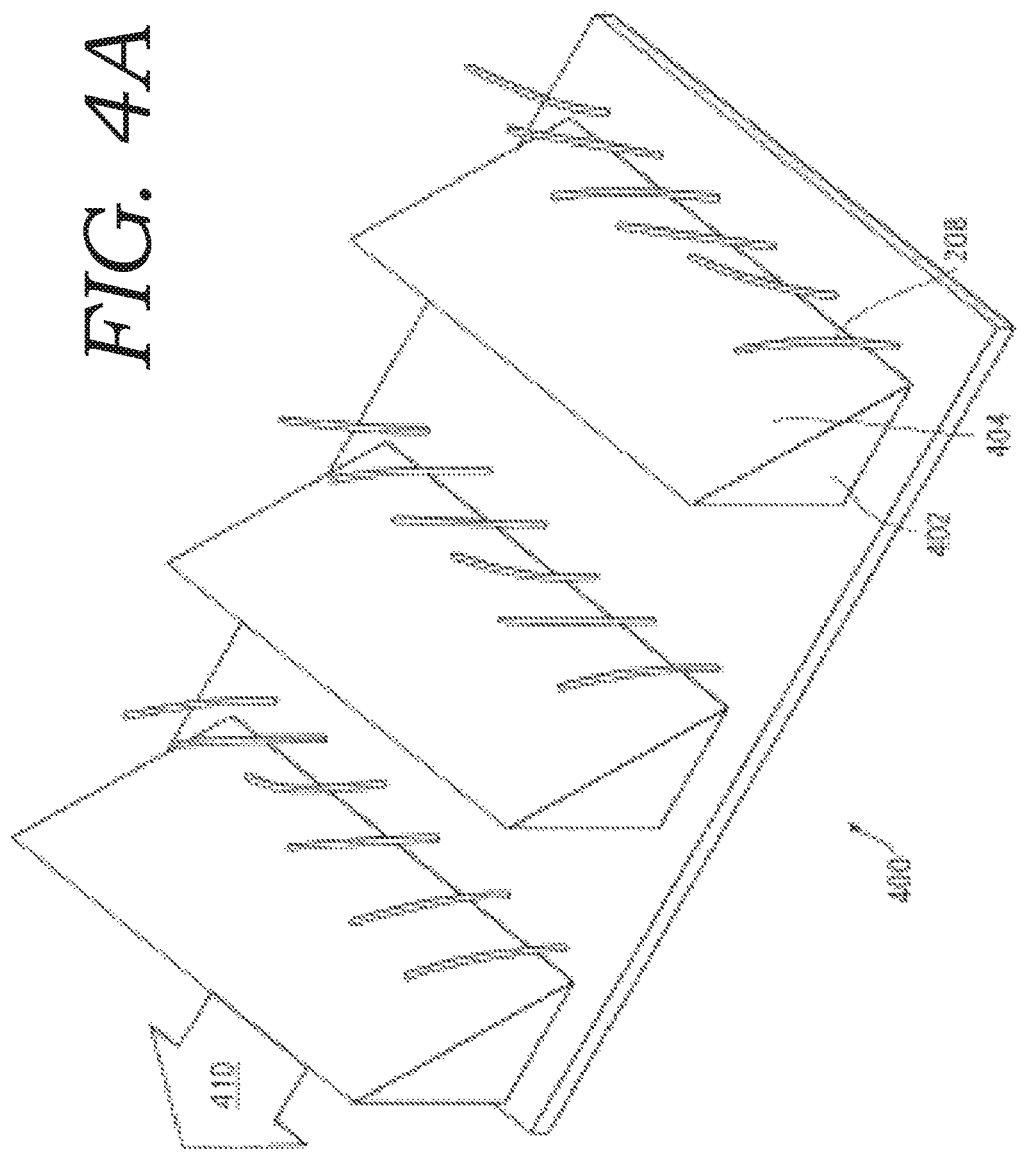

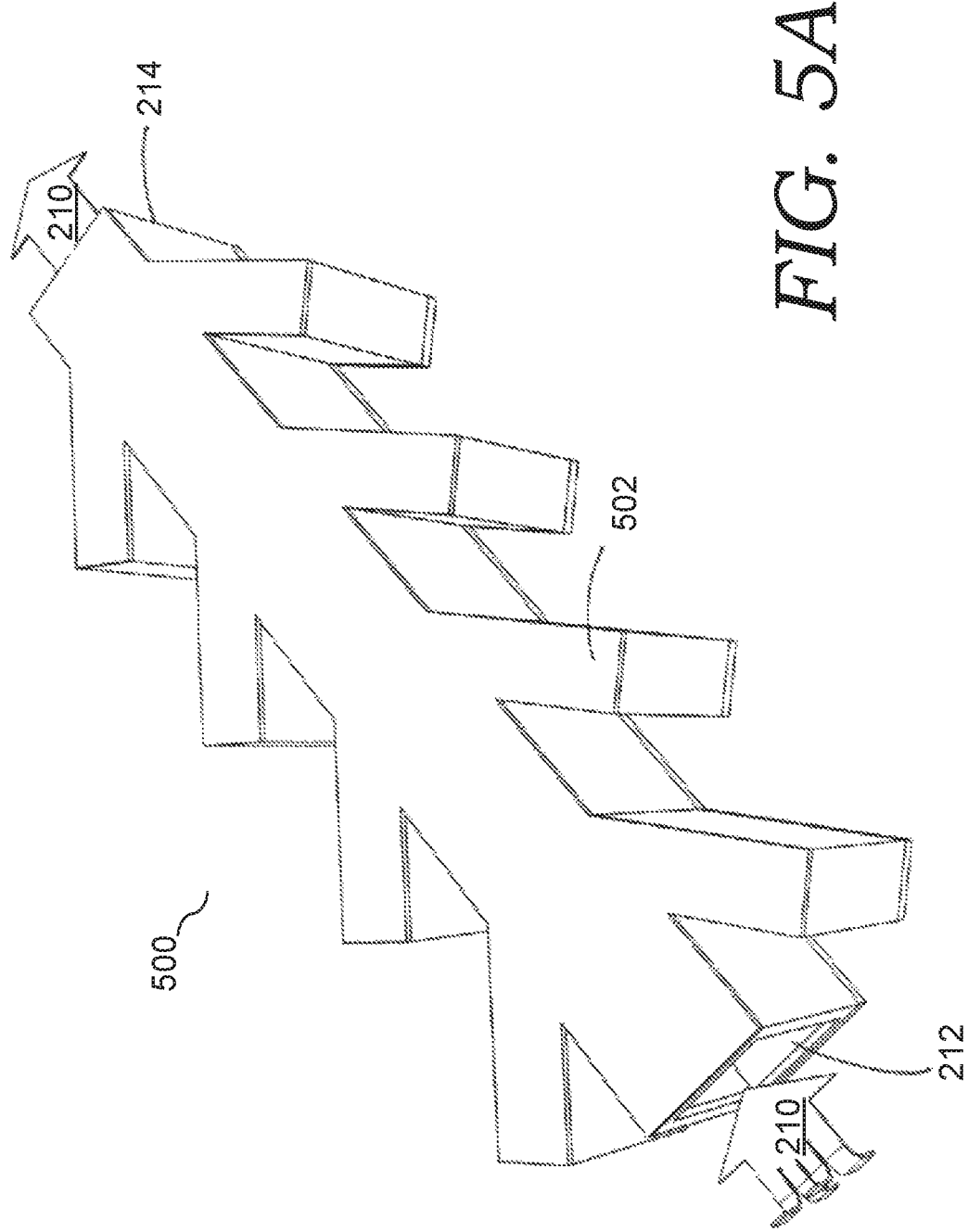

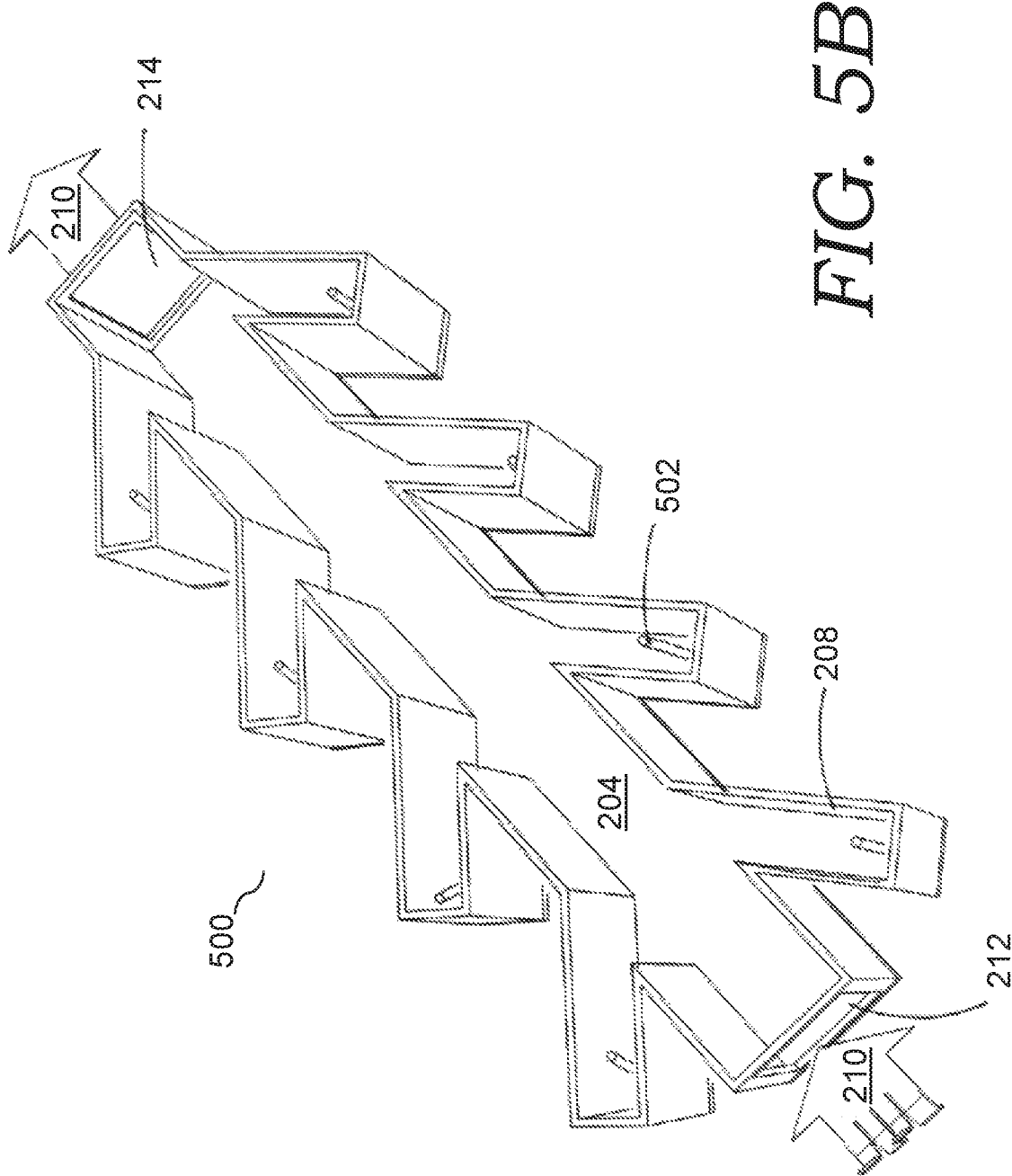

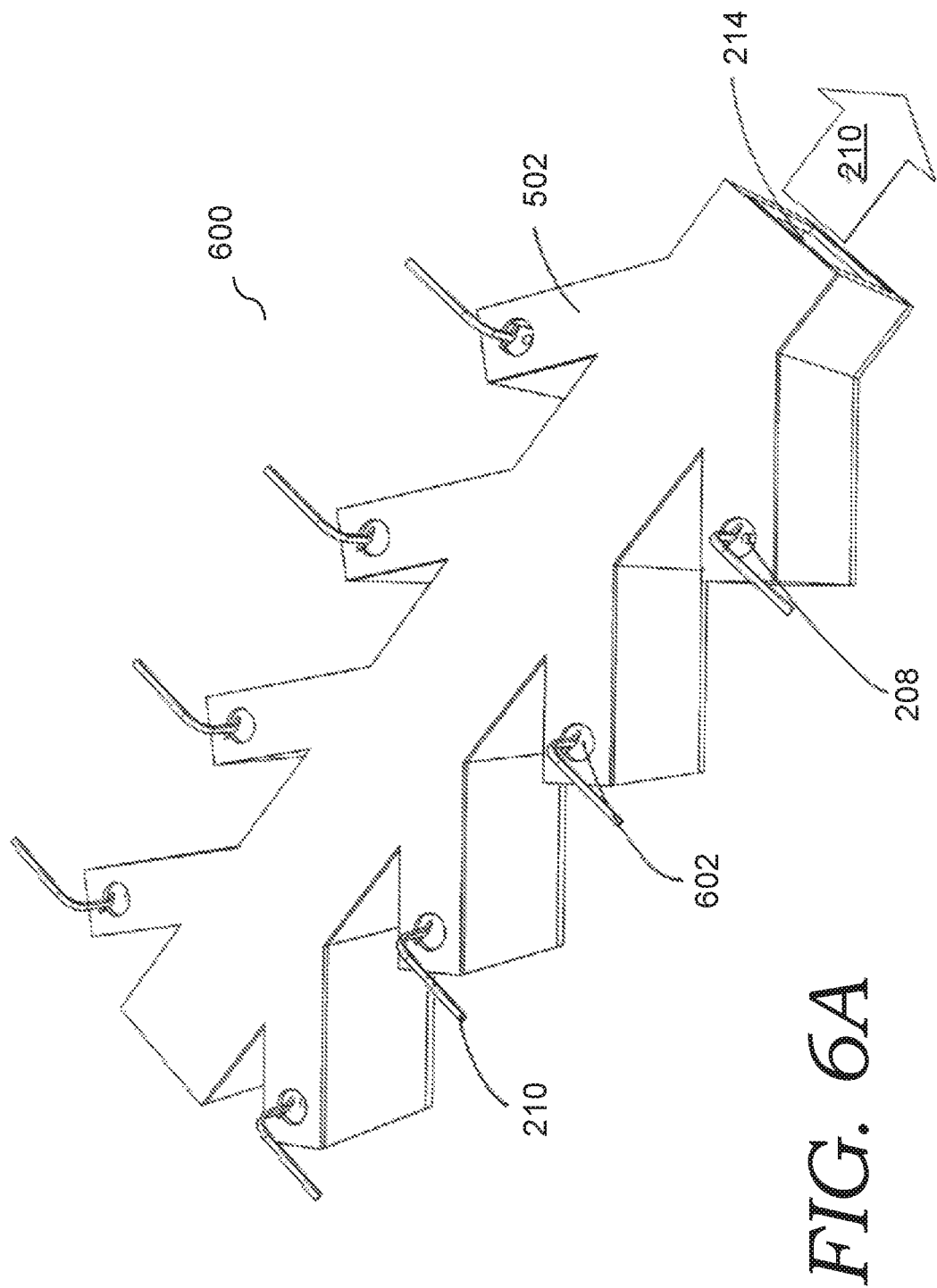

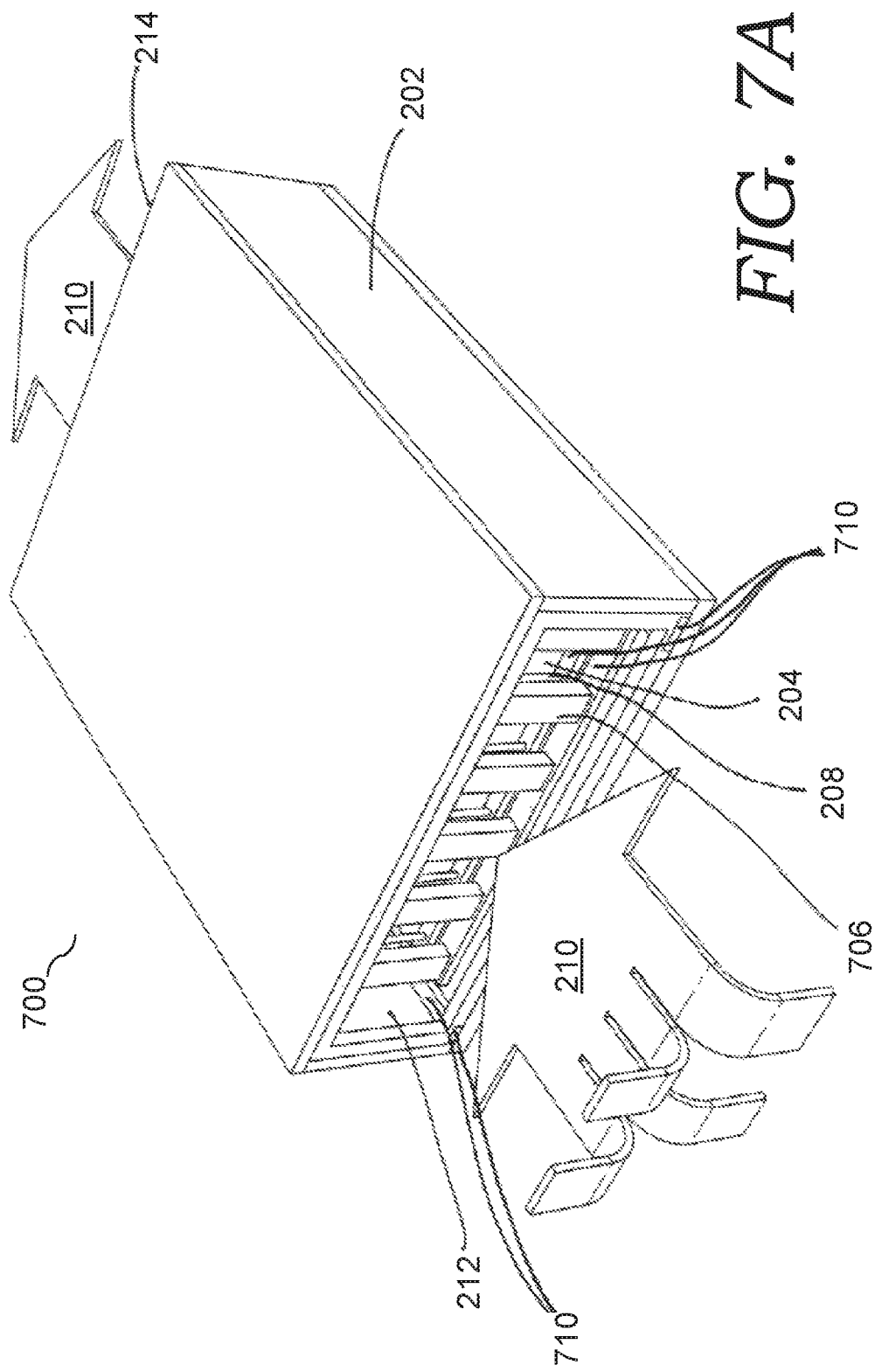

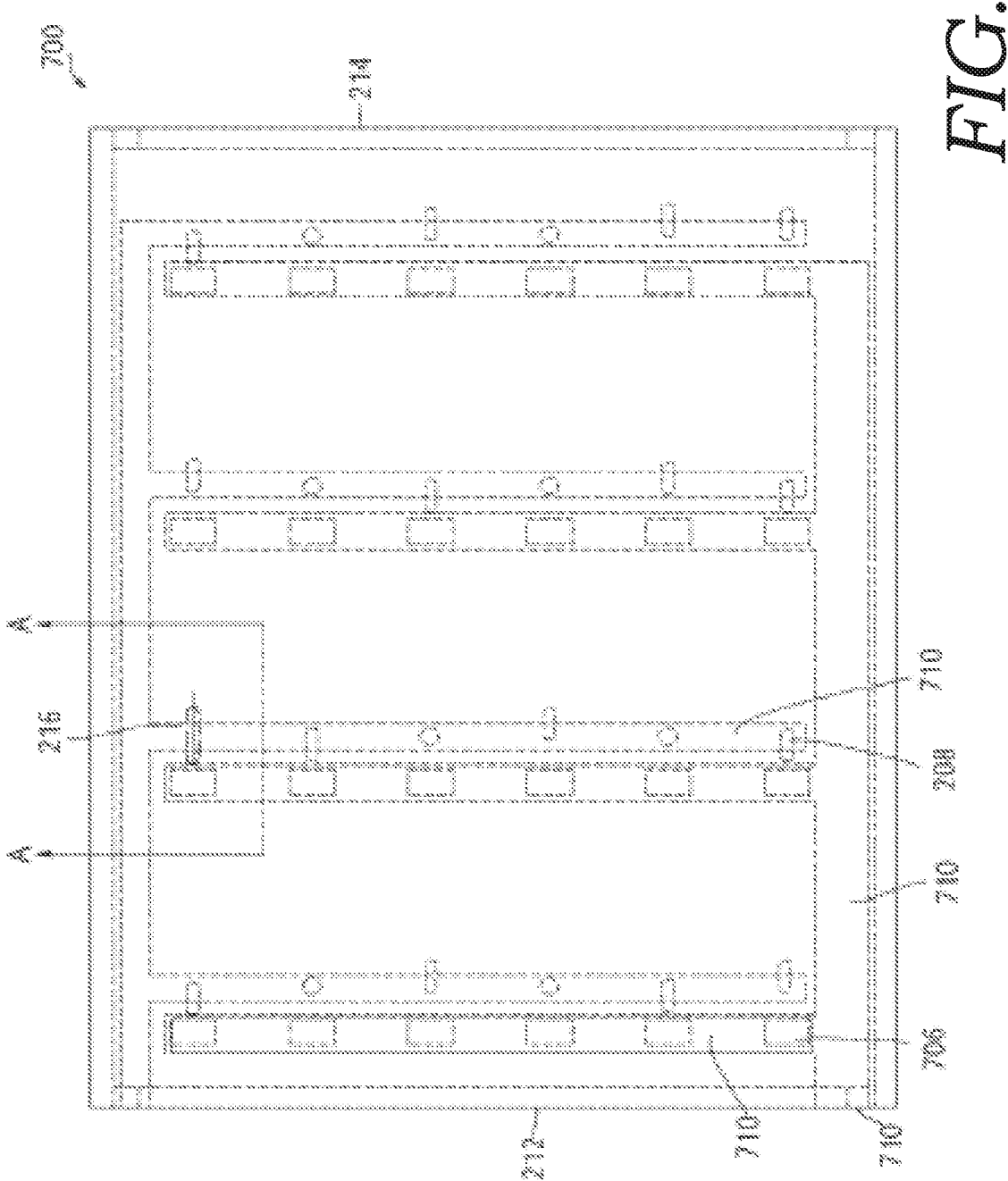

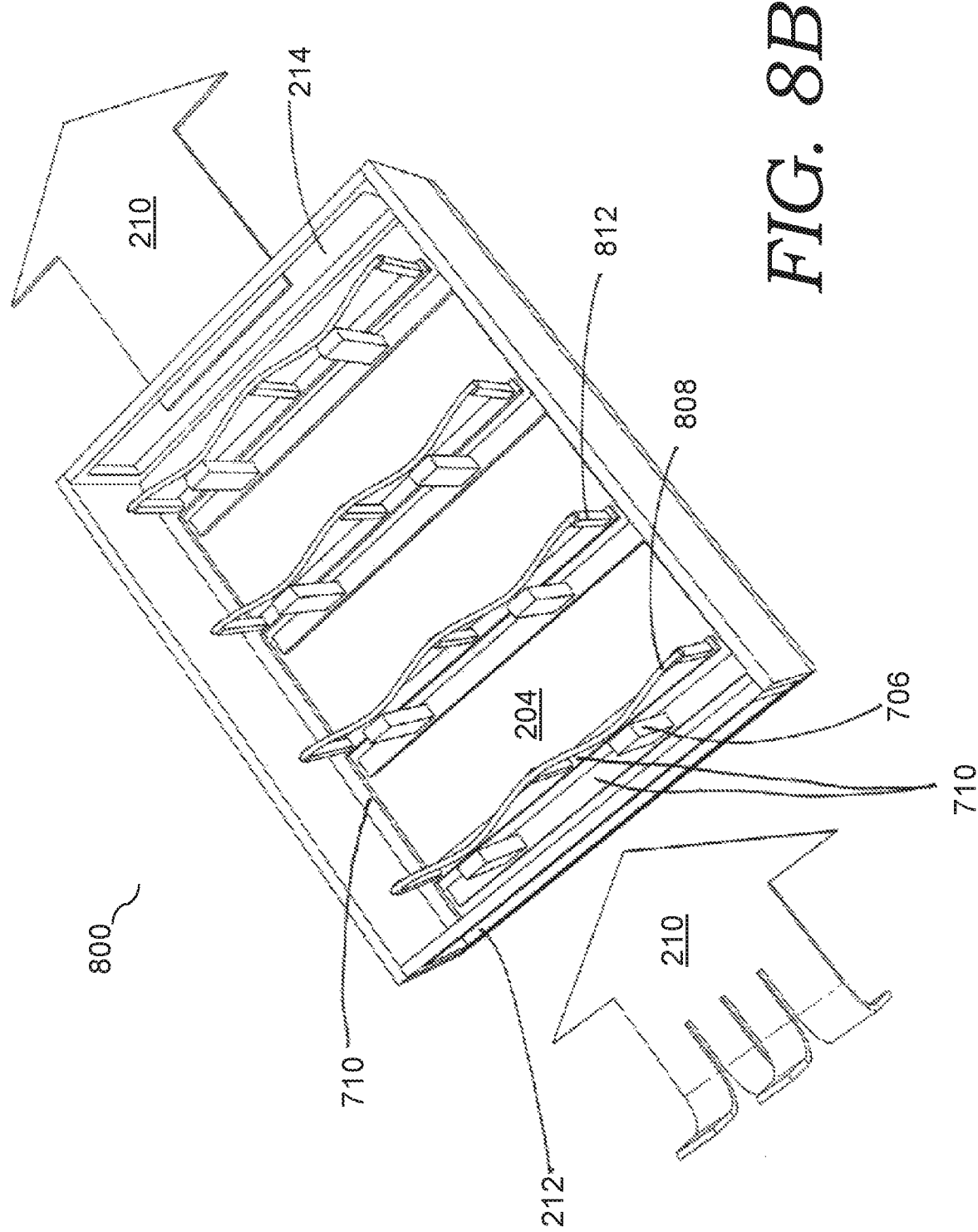

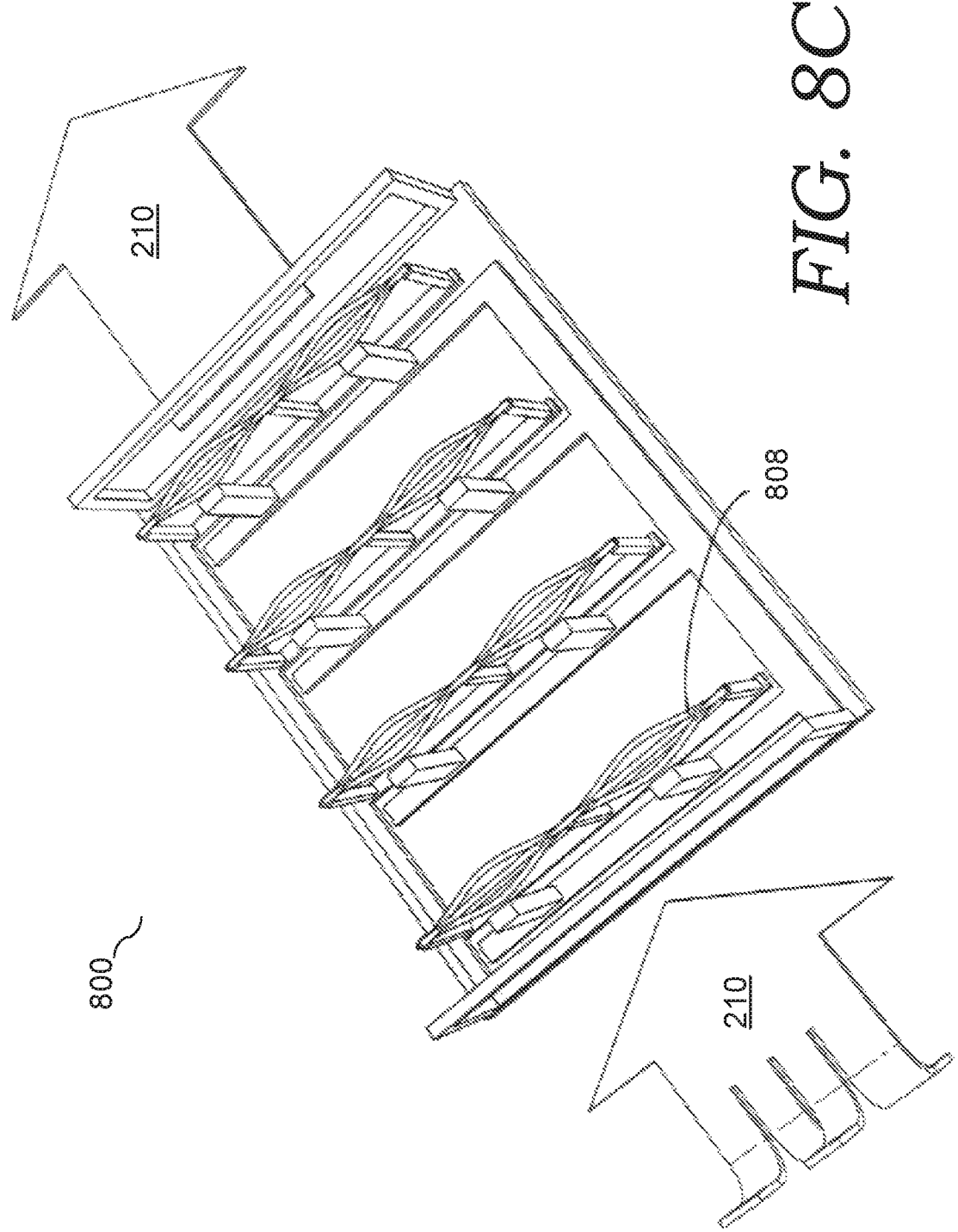

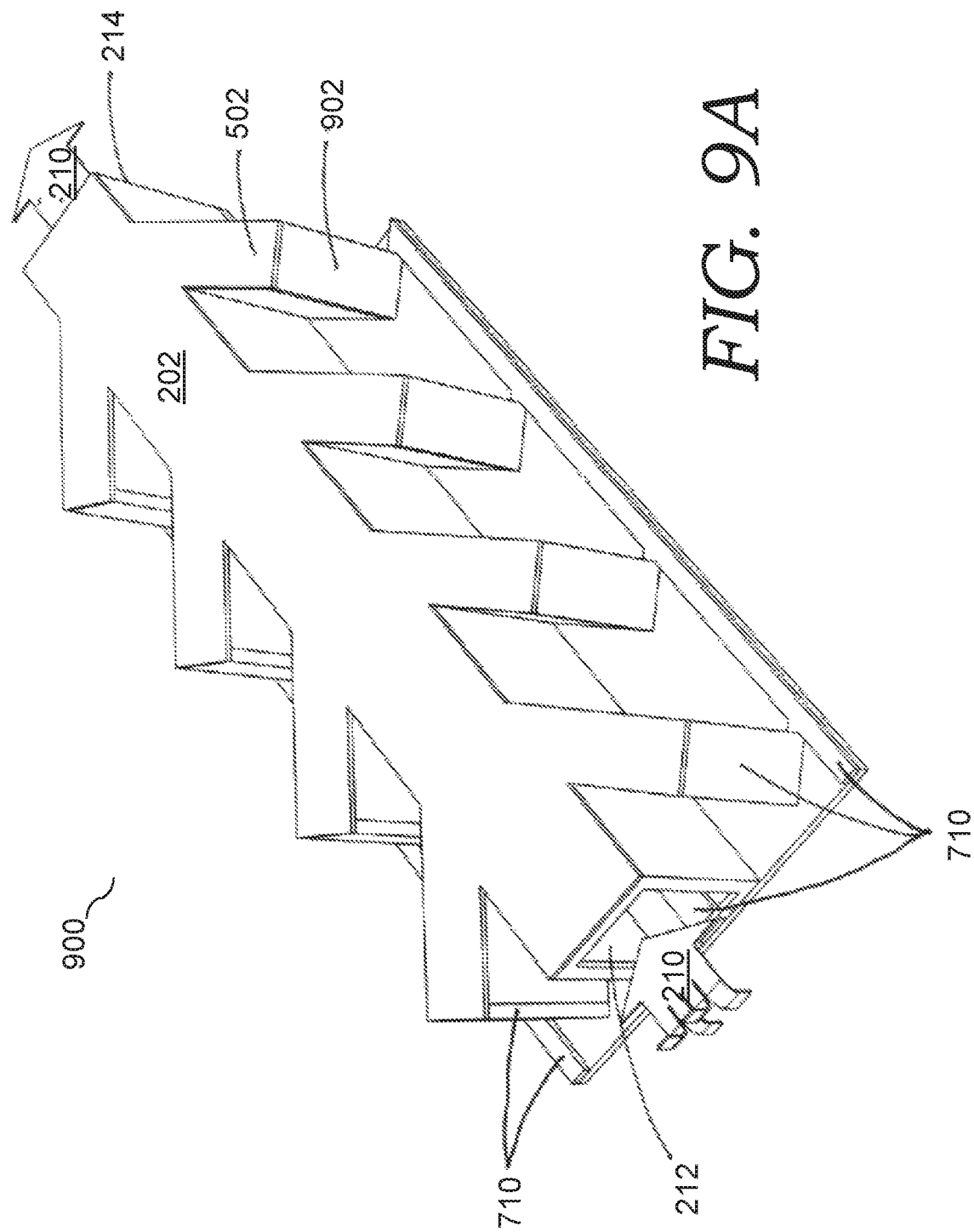

ENERGY CONVERSION SYSTEM INCLUDING A BALLISTIC RECTIFIER ASSEMBLY AND USES THEREOF

CROSS-REFERENCE TO RELATED PATENT APPLICATIONS

This application is a continuation-in-part of U.S. patent application Ser. No. 13/559,416, filed Jul. 26, 2012, entitled "Molecular-Scale Beam Pump Assemblies," which is a divisional of U.S. patent application Ser. No. 12/438,506, filed Feb. 23, 2009, entitled "Molecular-Scale Beam Pump Assemblies," which is the 35 U.S.C. § 371 national application of International Application No. PCT/US09/34737, filed Feb. 20, 2009, which designated the United States claiming priority to: provisional U.S. Patent Application Ser. No. 61/030,383, filed on Feb. 21, 2008, entitled "Nanofilament Pump Assemblies," and U.S. Patent Application Ser. No. 61/094,507, filed on Sep. 5, 2008, entitled "Molecular-Scale Beam Pump Assemblies'" Each of the foregoing patent applications are commonly assigned to the Assignee of the present invention, and the foregoing patent applications are hereby incorporated herein by reference in their entirety for all purposes.

TECHNICAL FIELD

The present invention relates to molecular-scale beam (including nanofilament) heat and/or charge pump assemblies.

BACKGROUND

Electromechanical assemblies based on suspended nanotubes and other molecular-scale electrically conductive and mechanically flexible wires and their use as motors, generators, pumps, fans, compressors, propulsion systems, transmitters, receivers, heat engines, heat pumps, magnetic field sensors, magnetic field generators, inertial energy storage, and acoustic energy conversion are described in U.S. Pat. No. 7,196,450, issued to Pinkerton et al., on Mar. 27, 2007, entitled "Electromechanical Assemblies Using Molecular-Scale Electrically Conductive And Mechanically Flexible Beams And Methods For Application Of Same," which patent is incorporated herein by reference. Heat activated nanometer-scale pumps are described in U.S. Patent Application Publication No. 20070048160 to Pinkerton, published Mar. 1, 2007, entitled "Heat Activated Nanometer-Scale Pump," which application is incorporated herein by reference.

Thermally driven excitations of multi-wall carbon nanotubes (MWNTs), clamped at one end only, were investigated by Treacy, et al. (*Nature* 1996, 381, 678). Electrically driven mechanical vibrations of multi-walled nanotubes was observed by Poncharal, et al. (*Science*, 1999, 283, 1513). Babic, et al. (*Nano Letters* 2003, 3(11), 1577) later described thermally driven mechanical vibrations of suspended doubly clamped single-wall carbon nanotubes (SWNTs) in thermal equilibrium at room temperature, and calculated the Young's modulus of CVD-grown SWNTs from the measured rms vibration amplitude.

SUMMARY OF THE INVENTION

The invention relates to a nanomechanical and/or nanoelectromechanical nanofilament pump assembly apparatuses and methods of use thereof. Such nanomechanical and nanoelectromechanical nanofilament pump assemblies utilize thermally generated power to create or enhance fluid flow.

In general, in one aspect, the invention features an apparatus that includes a nanomechanical pump assembly, with the nanomechanical pump assembly including (a) a body having a cavity, (b) nanofilaments, (c) a surface, and (d) a fluid flow path through the body. The body includes at least two openings, with the first opening to allow fluid to flow into the cavity, and the second opening to allow the fluid to flow out of the cavity. The nanofilaments are coupled to the body within the cavity and are operable to vibrate in response to thermal forces. The surface is proximate to the nanofilaments. The fluid flow path allows the fluid to flow (i) through the cavity from the first opening to the second opening, and (ii) by the surface and at least one of the nanofilaments. The surface and the nanofilaments are positioned within the cavity such that molecules of the fluid can collide with some (or all) of the surface and nanofilaments so that the molecules are accelerated along the fluid flow path due to thermal vibration of the nanofilaments.

Implementations of the invention can include one or more of the following features:

The nanofilaments can include cantilevered nanofilaments.

The nanofilaments can include carbon nanotubes.

The nanomechanical pump assembly can further include supports in the cavity. At least one of the nanofilaments can be coupled to a support at a first location along the length this first nanofilament. Furthermore, this first nanofilament can also be coupled to a second support at a second location along the length of this first nanofilament.

The surface can include pillars. The nanofilaments can be proximate to pillars (i.e., one nanofilament proximate to one of the pillars, another filament proximate this pillar or another pillar, etc.).

The surface can include a wedge.

The first opening can include multiple holes in the body through which the fluid can flow into the body. Some (or all) of these holes are proximate to at least one nanofilament (i.e., the first hole is proximate to a nanofilament or a group of nanofilaments, the second hole is proximate to a different nanofilament or a different group of nanofilaments, etc.).

The body can include a channel and vanes. At least some vanes can have positioned within them at least one nanofilament (i.e., one vane having a nanofilament or a group of nanofilaments positioned within it, another vane having a different nanofilament or a different group of nanofilaments positioned within it, etc.).

The nanomechanical pump assembly can be a nanoelectromechanical pump assembly.

The nanoelectromechanical pump assembly can further include an electrically conductive surface proximate the nanofilaments, with these nanofilaments operable to be intermittently electrostatically attracted to the electrically conductive surface such that (a) the nanofilaments are operable to oscillate in response to the intermittent electrostatic attraction, and (b) the oscillation of nanofilaments is operable to accelerate the molecules along the fluid flow path.

The nanoelectromechanical pump assembly can further include supports in the cavity. The first nanofilament can be coupled to a first support at a first location along the length the first nanofilament, and also coupled to a second support at a second location along the length of the first nanofilament.

The apparatus can further include a generator. The nanomechanical pump assembly can be operatively connected to the generator such that the fluid can flow from the nanomechanical pump assembly to the generator. The generator can also be operable for generating electricity based upon the flow of fluid from the nanomechanical pump assembly.

The generator can further include a turbine generator having a fluid intake. The nanomechanical pump assembly can be operatively connected to the turbine generator such that the fluid can flow from the nanomechanical pump assembly to the turbine generator through the fluid intake.

The apparatus can further include a unit. The unit can be positioned in the apparatus such that (a) the nanomechanical pump assembly can cool the unit, (b) heat from the unit can be at least a part of the thermal forces operable to vibrate the nanofilaments, or (c) both. The unit can be an integrated circuit, a semiconductor device, a microchip, etc.

The nanomechanical pump assembly can further include a focusing element. The focusing element focuses can be positioned to increase the thermal forces that are applied upon the nanofilaments. The focusing element can further include concave reflective recesses operable to focus light on the nanofilaments (i.e., one concave reflective recess is operable to focus light on one nanofilament, another concave reflective recess is operable to focus light on another nanofilament, etc.).

In general, in another aspect, the invention features a method of accelerating molecules in a fluid. This method includes (a) directing a flow of the fluid toward a nanofilament undergoing thermal vibration and a surface proximate the nanofilament. This method further includes (b) allowing molecules in the fluid to collide with the nanofilament and the surface, such that the molecules are accelerated. This method further includes (c) directing a flow of the accelerated fluid molecules toward a target.

Implementations of the invention can include one or more of the following features:

The method can further include applying a voltage to an electrically conductive surface such that the nanofilament oscillates in response.

In general, in another aspect, the invention features a nanomechanical pump, with the nanomechanical pump including (a) a body, (b) nanofilaments, and (c) a surface. The nanofilaments include a free moving portion having a first side. The nanofilaments are coupled to the body, and the free moving portions of the nanofilaments are operable to exchange kinetic energy with fluid molecules of a fluid by striking and accelerating the fluid molecules. The first sides of the free moving portions of the nanofilaments are located proximate to the surface such that the free moving portions are operable to strike a fraction of the fluid molecules against the surface before the accelerated fluid molecules can strike another fluid molecule.

Implementations of the invention can include one or more of the following features:

The fraction can be at least about 10%.

The fluid can include air.

The nanofilaments can include carbon nanotubes.

In general, in another aspect, the invention features an apparatus that includes (a) an assembly, (b) nanofilaments, and (c) a surface. The nanofilaments are coupled to the assembly, with the nanofilaments operable to vibrate in response to thermal forces. The surface is proximate to at least some of the nanofilaments. The surface and the plurality of nanofilaments are positioned such that molecules of a fluid can collide with some (or all) of the surface and nanofilaments so that the assembly will be accelerated in a first direction due to thermal vibration of the nanofilaments.

Implementations of the invention can include one or more of the following features:

The apparatus can further include (d) a rotating support and (e) a generator. The rotating support can support the assembly and is operable for rotating in the first direction. The generator can be operable to generate electricity due to the rotation of the rotating support.

In general, in another aspect, the invention features an apparatus that includes a pump assembly, with the pump assembly including (a) a plate having an opening having an edge, and (b) cantilevered molecular-scale beams positioned over the opening. The cantilevered molecular-scale beams each have a tip that is proximate the edge of the opening. The cantilevered molecular-scale beams are operable to asymmetrically oscillate such that molecules of a fluid are accelerated through the opening.

Implementations of the invention can include one or more of the following features:

The plate can include a second opening having an edge. The pump assembly can further include additional cantilevered molecular-scale beams positioned over the second opening. The additional cantilevered molecular-scale beams each have a tip that are proximate the edge of the second opening. The additional cantilevered molecular-scale beams are operable to asymmetrically oscillate such that molecules of the fluid are accelerated through the second opening.

The cantilevered molecular-scale beams can include cantilevered nanofilaments. The additional cantilevered molecular-scale beams can also include cantilevered nanofilaments.

The cantilevered molecular-scale beams can include cantilevered carbon nanotubes. The additional cantilevered molecular-scale beams can also include cantilevered carbon nanotubes.

In general, in another aspect, the invention features an apparatus including a pump assembly, with the pump assembly including (a) a first surface, (b) a second surface, (c) an opening, and (d) cantilevered molecular-scale beams. The second surface is linearly spaced from the first surface. The cantilevered molecular-scale beams are coupled to the first surface at their first ends (i.e., a first cantilevered molecular-scale beams is coupled to the first surface at its first end, a second cantilevered molecular-scale beams is coupled to the first surface at its first end, etc.). The other ends of the cantilevered molecular-scale beams are free ends proximate the second surface (i.e., the other end of the first cantilevered molecular-scale beams is a free end proximate the second surface, the other end of the second cantilevered molecular-scale beams is a free end proximate the second surface, etc.). Some of the free ends are proximate an edge of the second surface, while some of the free ends are not proximate the edge of the second surface (for example, the free end of the first cantilevered molecular-scale beams is proximate the edge of the second surface, while the free end of the second cantilevered molecular-scale beams is not). The cantilevered molecular-scale beams are operable for accelerating molecules of a fluid through the opening by asymmetric oscillation of the cantilevered molecular-scale beams.

Implementations of the invention can include one or more of the following features:

The apparatus can further include a generator operatively connected to the pump assembly.

The apparatus can further include a unit operatively connected to the pump assembly. The unit can be an integrated circuit, a semiconductor device, a microchip, etc.

In general, in another aspect, the invention features a method of accelerating molecules in a fluid. The method includes (a) directing a flow of the fluid toward a asymmetrically oscillating molecular-scale beams. The method further includes (b) allowing molecules in the fluid to collide with the beams such that the molecules are accelerated away from the beams.

In general, in another aspect, the invention features a nanomechanical pump including (a) a body, (b) cantilevered nanofilaments, and (c) a surface. The cantilevered nanofilaments are coupled to the body and include a free moving portion (i.e., a first cantilevered nanofilaments is coupled to the body and has a free moving portion, a second cantilevered nanofilaments is coupled to the body and has a free moving portion, etc.). The free moving portions of the cantilevered nanofilaments are operable to exchange kinetic energy with a plurality of fluid molecules of a fluid by striking the fluid molecules. The surface is substantially perpendicular to the cantilevered nanofilaments. The surface is located a distance from the free moving portions of the cantilevered nanofilaments. The surface has an edge near some of the free moving portions that is operable to restrict their motion through a non-contact force.

Implementations of the invention can include one or more of the following features:

The non-contact force can include a van der Waals force.

The non-contact force can include an electrical force.

The distance can be at most about one nanometer.

The fluid can include air.

The cantilevered nanofilaments can include cantilevered carbon nanotubes.

There has thus been outlined, rather broadly, the more important features of the invention in order that the detailed description thereof may be better understood, and in order that the present contribution to the art may be better appreciated. There are additional features of the invention that will be described hereinafter.

In general, in another aspect, the invention features an energy conversion system including an energy conversion device. The energy conversion device includes a first graphene vane, a second graphene vane, a graphene channel, and a resistor having a first terminal and a second terminal. The first graphene vane is electrically connected to the graphene channel at a first angle. The second graphene vane is electrically connected to the graphene channel at a second angle. The first terminal is electrically connected to the first graphene vane. The second terminal is electrically connected to the second graphene vane.

Implementations of the invention can include one or more of the following features:

The first angle can be between 10 degrees and 80 degrees relative to the graphene channel. The second angle can be between 10 degrees and 80 degrees relative to the graphene channel.

The first angle can be between 20 degrees and 40 degrees relative to the graphene channel. The second angle can be between 20 degrees and 40 degrees relative to the graphene channel.

The energy conversion system can include an array of a plurality of the energy conversion devices in series.

Average series voltage can be approximately at most 4 volts.

The energy conversion system can include an array of a plurality of the energy conversion devices in parallel.

Average parallel voltage can be approximately at most 4 volts.

The parallel array can be comprised of a plurality of layers in which each of the layers can include an energy conversion device of the energy conversion devices.

The energy conversion system can further include a substrate adjacent to the graphene channel.

The substrate can include hexagonal boron nitride.

The energy conversion system can include an array of a plurality of energy conversion devices in parallel.

The array can include a plurality of layers.

The layers of the plurality of layers can include a graphene layer and hexagonal boron nitride layer for the energy conversion device in the plurality of energy conversion devices.

The layers in the energy conversion device in the plurality of energy conversion devices can include a bottom layer of hexagonal boron nitride, a middle layer of graphene, and an upper layer of hexagonal boron nitride, in which, for at least some adjacent energy conversion devices in the plurality of energy conversion devices, the bottom layer of hexagonal boron nitride of an upper adjacent energy conversion device is the upper layer of hexagonal boron nitride for a bottom adjacent energy conversion device.

Mean free path of an electrical charge within the graphene can be between 0.1 and 10 times of length of the first graphene vane.

Mean free path of an electrical charge within the graphene is equal to length of the first graphene vane.

The energy conversion system can include an array of a plurality of the energy conversion devices in series and parallel.

In general, in another aspect, the invention features a device comprising an energy conversion system having an array of a plurality of the energy conversion devices in series and parallel. The device is a smart-phone or a smart-watch.

In general, in another aspect, the invention features an energy conversion system that includes a vane having a length, a channel, a hole in the vane; and a plurality of gas molecules. The vane is mechanically connected to the channel at an angle. Mean free path of the gas molecules is between 0.1 and 10 times the length of the vane.

Implementations of the invention can include one or more of the following features:

The mean free path of the gas molecules can be equal to the length of the vane.

The angle can be between 10 degrees and 80 degrees.

The angle can be between 20 degrees and 40 degrees.

In general, in another aspect, the invention features an energy conversion system including a sheet of graphene, a channel, a vane, a mean free path and a charge. The charge is operable to travel a distance down the vane toward the channel. The distance is approximately equal to the mean free path.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 3A-3C depict various views of an open-top heat pump pillar assembly.

FIGS. 4A-4B depict views of a heat pump wedge assembly.

FIGS. 5A-5B depict views of a closed-top heat pump channel assembly.

FIGS. 6A-6B depict views of an open-top heat pump channel assembly.

FIGS. 7A-7D depict various views of a charge pump pillar assembly.

FIGS. 8A-8C depict various views of a charge pump jump rope assembly.

FIGS. 9A-9B depict views of a charge pump channel assembly.

DETAILED DESCRIPTION

Nanofilaments can function as nanomechanical resonators that oscillate at high frequencies with small vibration amplitudes. As used herein, "nanofilament" generally refers to nanoscale wires or tubes, such as single-wall carbon nanotubes (SWNTs), thin strips of graphene, zinc oxide nanowires, etc. For example, SWNTs, with a high Young's modulus and low specific weight, can be incorporated in nanomechanical and nanoelectrical mechanical pump assemblies that channel the mechanical vibration modes to provide increased fluid flow in a desired direction. Swept volume and mass flow for these assemblies can be calculated as described below.

A nanofilament is modeled as a beam with a given length, radius, and Young's modulus, and mass and resonant frequency of the nanofilament can be calculated at a desired temperature (for example, room temperature). With an average number of nanofilaments per unit area, the average amplitude of thermal vibration and swept volume due to heat alone or with electrical input can be calculated. Tip velocity due to heat and electrical input, as well as mass flow of the electrical pump, pump power, and thrust per unit area and volume, can be calculated to yield thrust per watt, as well as swept volume and mass flow for a device with a given volume.

Figure 1:
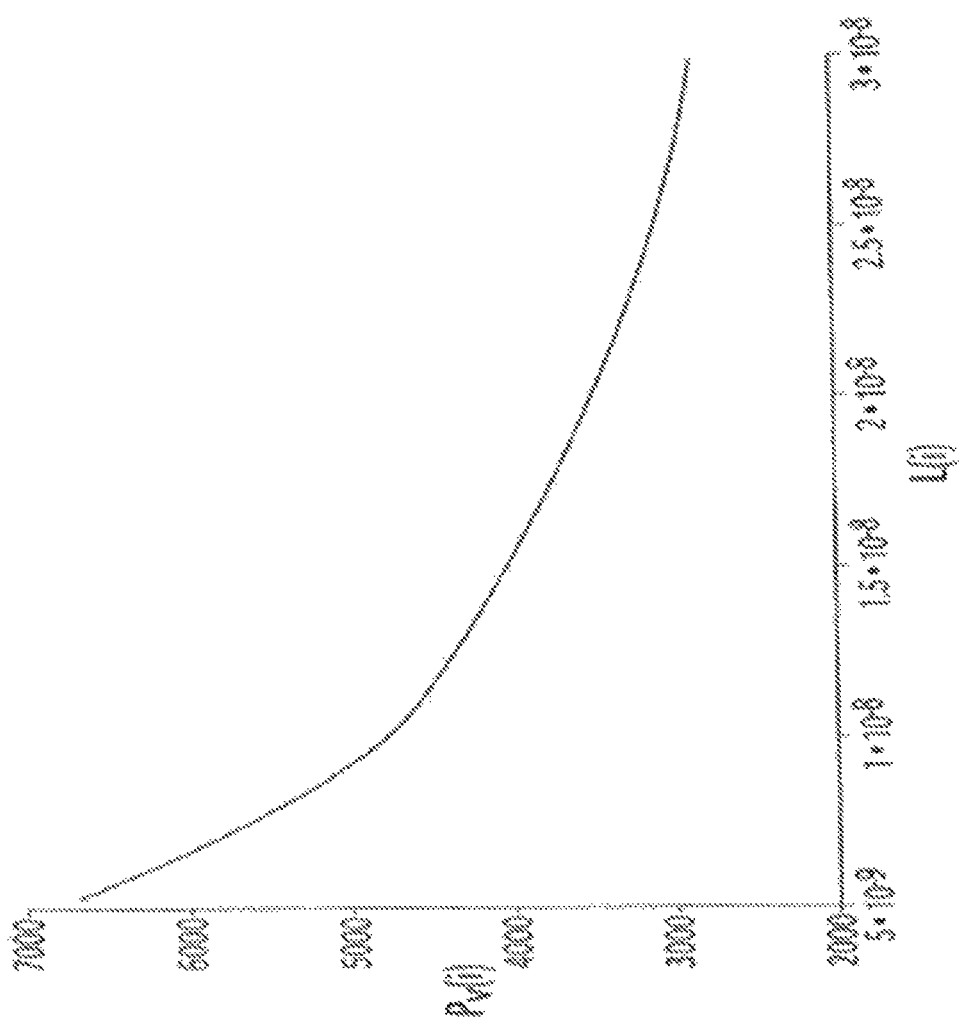
FIG. 1 depicts pump power per unit area calculated as a function of SWNT length for a SWNT pump assembly.

For $3.333 \times 10^{11}$ SWNT per $cm^2$ (radius $0.5 \times 10^{-9}$ m, length 30 nm) at a temperature of 300K, the resonant frequency is $1.784 \times 10^{10}$ Hz, and an average amplitude of thermal vibration is $1.089 \times 10^{-10}$ m. The swept volume due to heat alone is 0.08 $ft^3$/min, with a tip velocity of 7.77 m/s. The amplitude of electrically powered vibrations is $1.5 \times 10^{-9}$ m. The swept volume due to electrical input is 1.134 $ft^3$/min, and the tip velocity due to electrical input is 107.026 m/s. The mass flow of the pump due to heat alone per square centimeter is $4.662 \times 10^{-5}$ kg/s, the pump power per $cm^2$ is $1.408 \times 10^{-3}$ W, and the thrust due to the flow of air per $cm^2$ is $3.623 \times 10^{-4}$ N. Per $cm^3$, the amount of heat required to power the pump is $2.815 \times 10^3$ W and the thrust due to flow of air is 724.552 N, giving a thrust per watt (N/watt) of 0.257 s/m. Thus, the swept volume and mass flow for a 1 $cm^3$ device are 77.704 $m^3$/s and 93.245 kg/s, respectively. For this system, $3.811 \times 10^3$ W of heat would be required to lift a 100 kg load. FIG. 1 depicts the thermal power required to activate the pump per $cm^3$ calculated as a function of SWNT length.

The following nanomechanical and nanoelectromechanical nanofilament pump assemblies demonstrate the use of this thermally generated power to create or enhance fluid flow. Heat can be supplied by, for example, an ambient environment, the sun, a hot microchip, burning fuel, etc. The fluid flow can be converted to other forms of energy such as, for example, mechanical energy or electricity, with output increasing with increased thermal and/or electrical input. An array of nanofilament pump assemblies can also be used to convert heat or electricity into thrust to accelerate and control a vehicle such as an automobile or an aircraft.

Figure 2A:
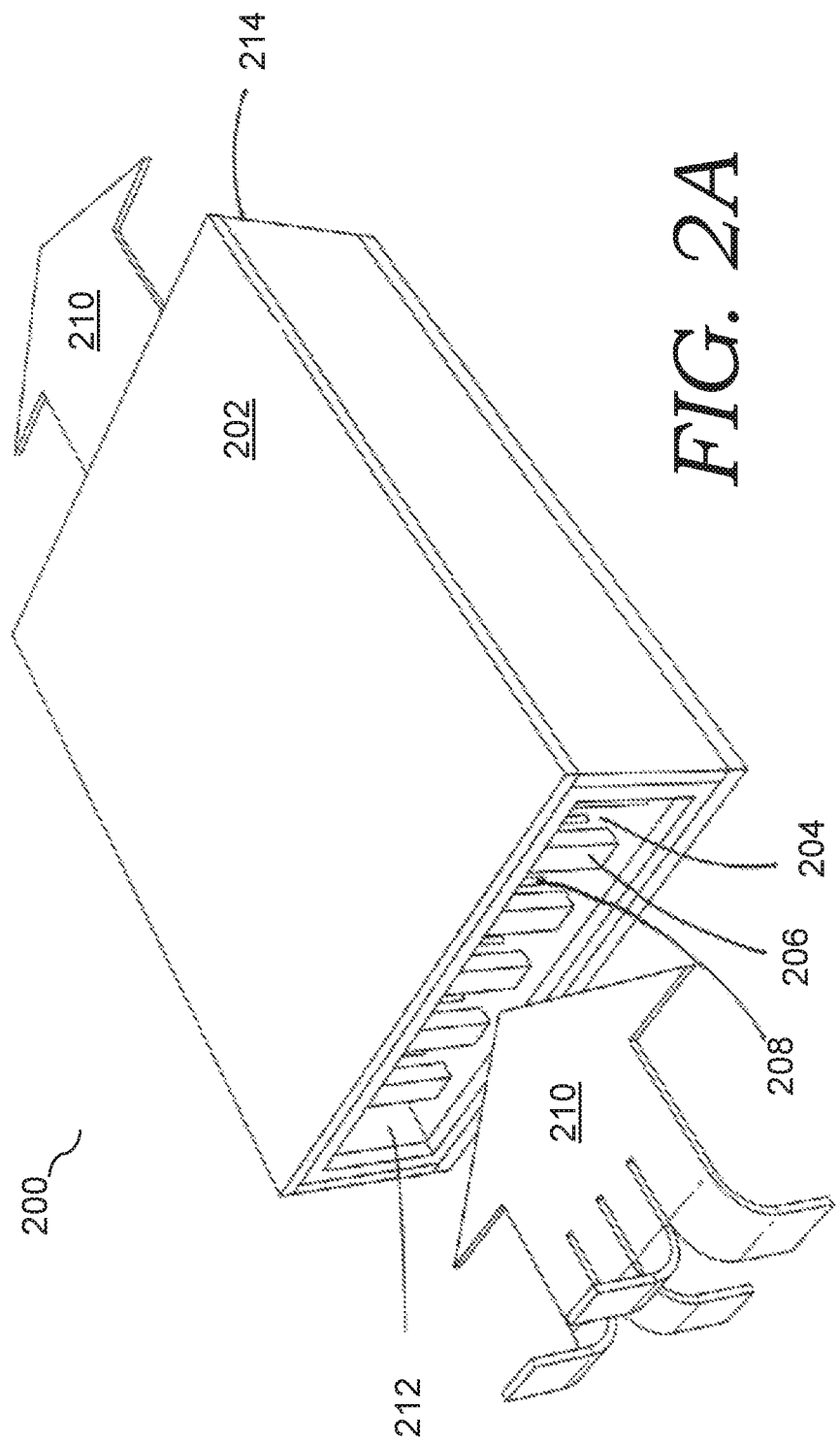
FIGS. 2A-2E depict various views of a closed-top heat pump pillar assembly

FIG. 2A depicts heat pump pillar assembly 200 (an embodiment of the present invention). Heat pump pillar assembly 200 includes body 202 with cavity 204, pillars 206, and cantilevered nanofilaments 208 coupled to the body proximate the pillars. Fluid 210 enters the assembly 200 through opening 212 and is pumped through assembly 200 and out opening 214. The pumping action is due to the thermal motion of nanofilaments 208 resulting from interaction between the fluid molecules (e.g., gas or liquid molecules) with the nanofilaments and also by the thermal motion of the molecules within the nanofilaments. As there are no openings at the top of heat pump pillar assembly 200, it is a closed-top heat pump pillar assembly.

Figure 2B:
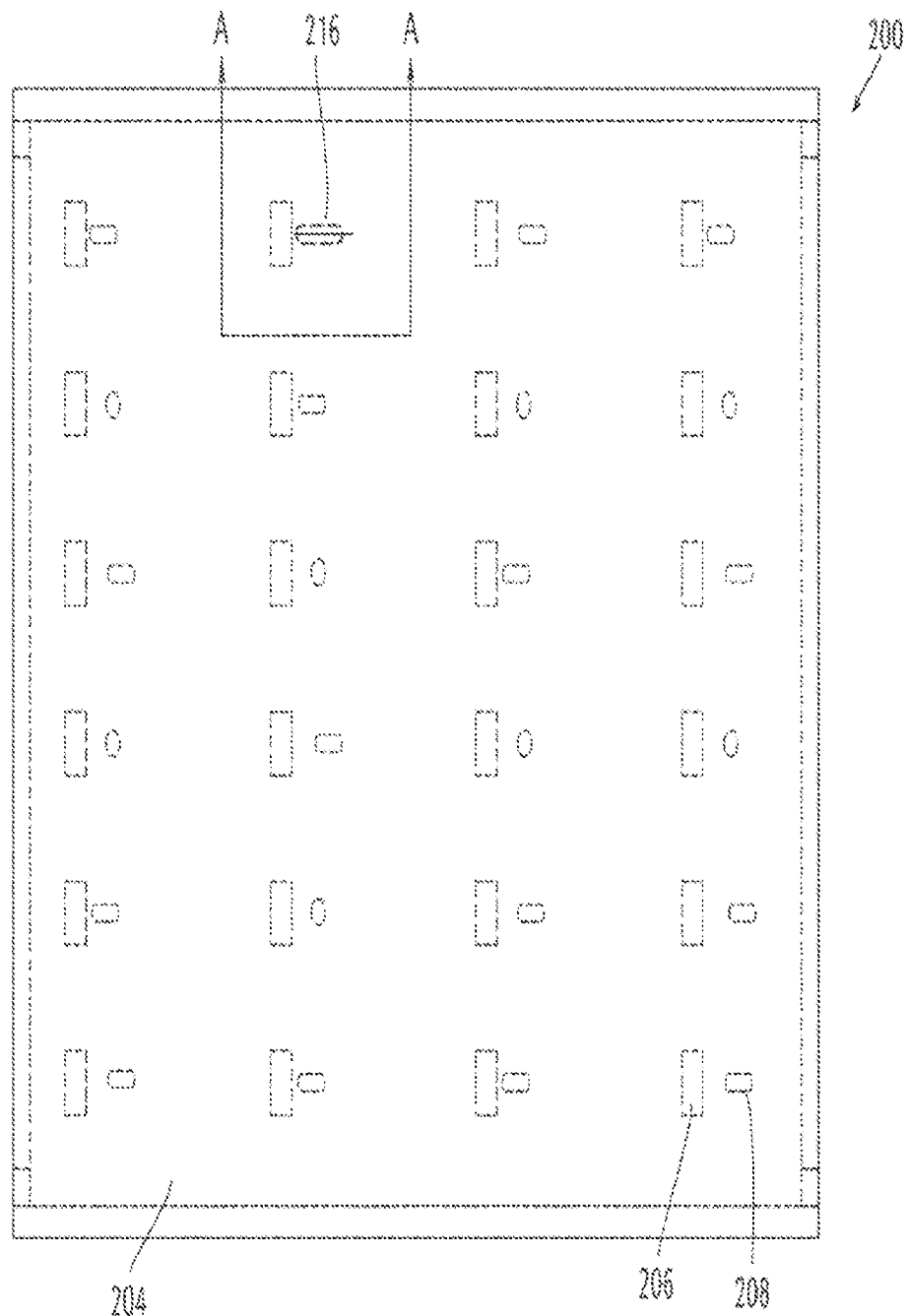

FIG. 2B depicts a top view of the closed-top heat pump pillar assembly 200 with pillars 206 and nanofilaments 208 in cavity 204. Motion of the cantilevered nanofilament 208 is depicted as trace 216 indicating tip displacement of the nanofilament due to thermal vibration. While the trace 216 is illustrated in FIG. 2B with the nanofilament 218 vibrating in a direction normal to pillar 206, there is nothing to requires the vibration of nanofilament 218 occur only in that direction, and it is not required that nanofilament 208 be limited or restricted to vibrate in such direction.

Figure 2C:
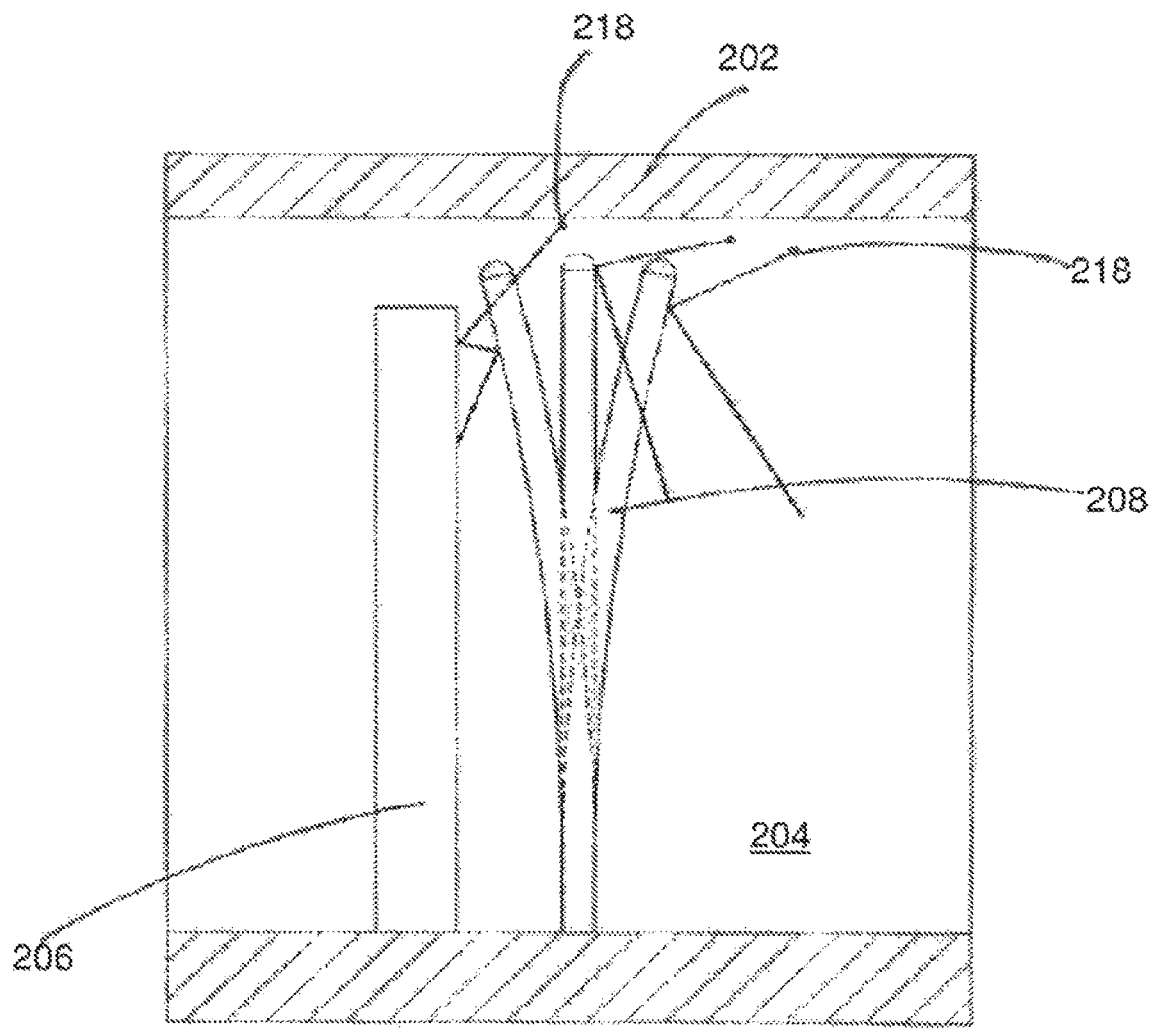

FIG. 2C depicts a cross-sectional view inside assembly 200 along segment AA of FIG. 2B. As shown in FIG. 2C, fluid molecules 218 collide directly with nanofilament 208 and/or pillar 206. (In FIG. 2C, nanofilament 208 is illustrated in three vibrational positions; the middle of these three positions is the equilibrium (vertical) position). Deflection of the nanofilament 208 caused by the collisions are depicted by the range of movement of the nanofilament away from its equilibrium (vertical) position.

Figure 2D:
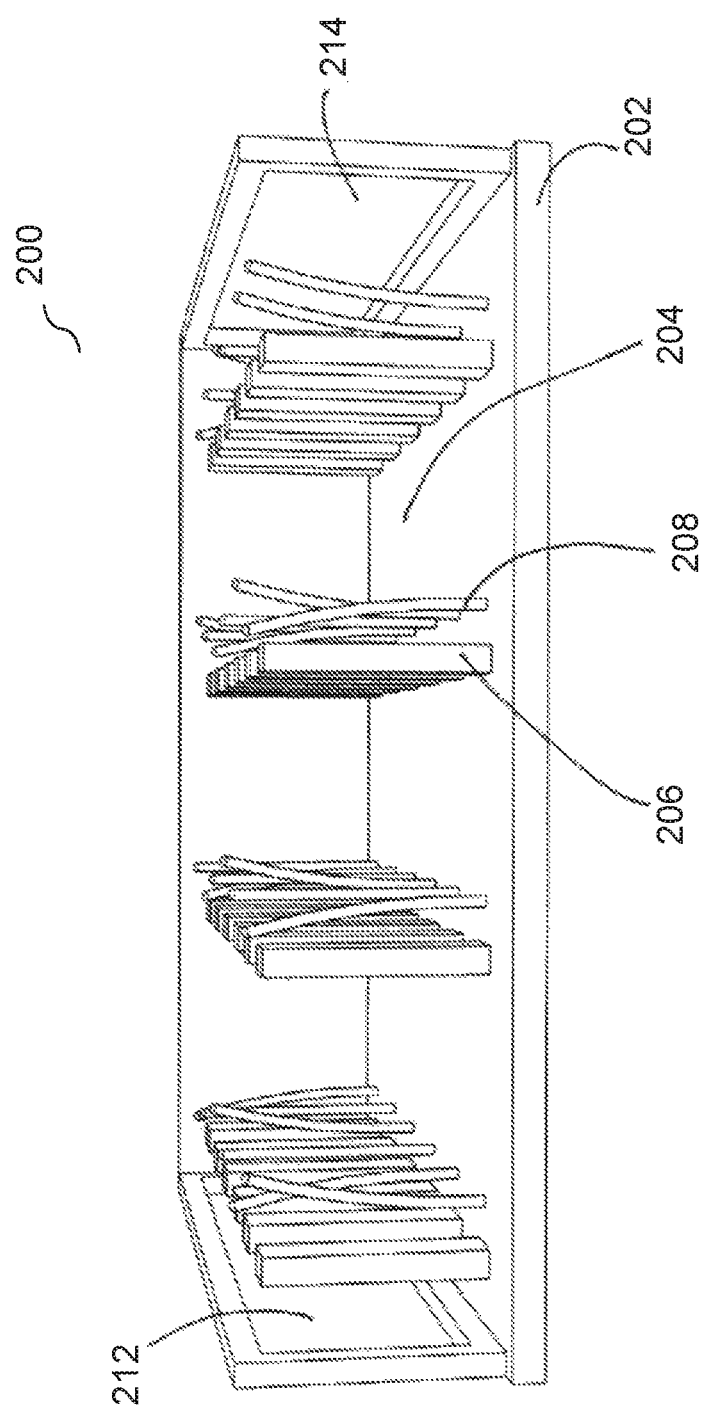
Figure 2E:
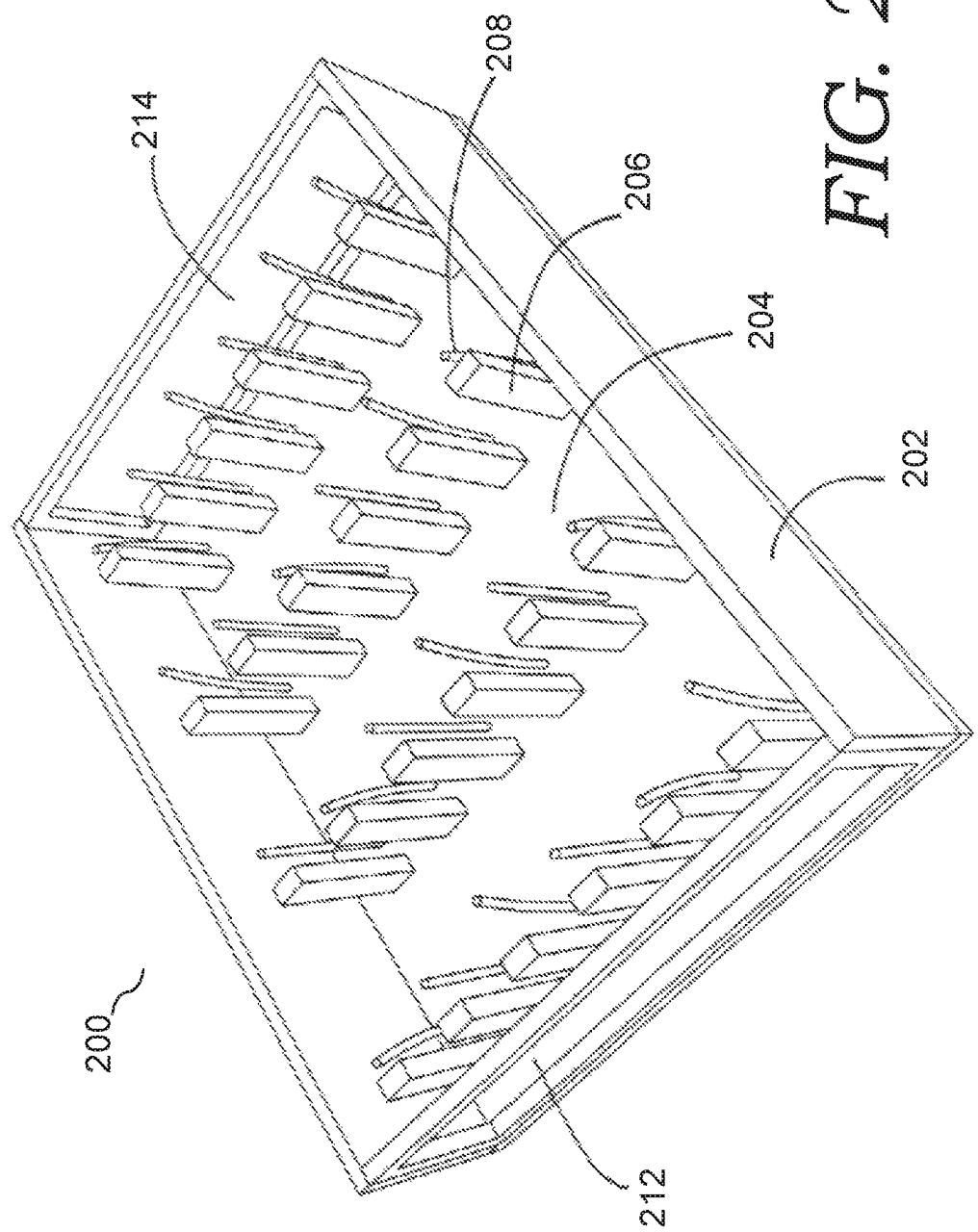

FIGS. 2D and 2E depict partially cut-away perspective views of assembly 200, with nanofilaments 208 vibrating proximate pillars 206 in cavity 204.

Figure 3A:
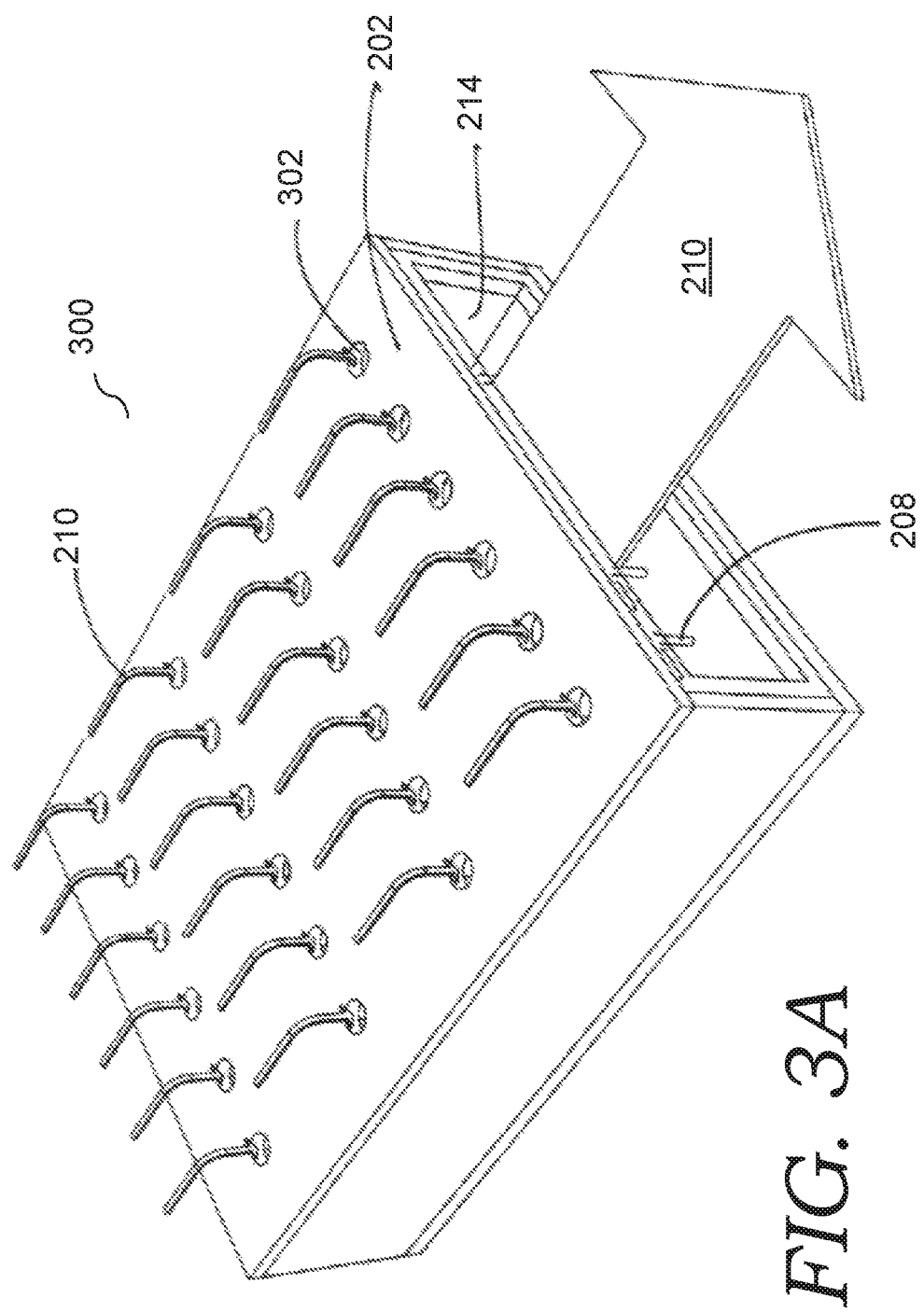

FIG. 3A depicts heat pump pillar assembly 300 with fluid flow openings 302 in the body 202 of the assembly. (Accordingly, heat pump pillar assembly 300 is an open-top heat pump pillar assembly). As shown in FIG. 3A, openings 302 are positioned above (e.g., directly above) the nanofilaments 208. Fluid 210 flows through openings 302 and out opening 214 according to the same mechanism as described for, and illustrated in, FIGS. 2A-B.

FIG. 3B depicts a top view of the open-top heat pump pillar assembly 300 with openings 302 and nanofilaments 208 in cavity 204. Motion of the nanofilaments 208 is depicted as trace 216 indicating tip displacement of the nanofilament due to thermal vibration.

Figure 3C:
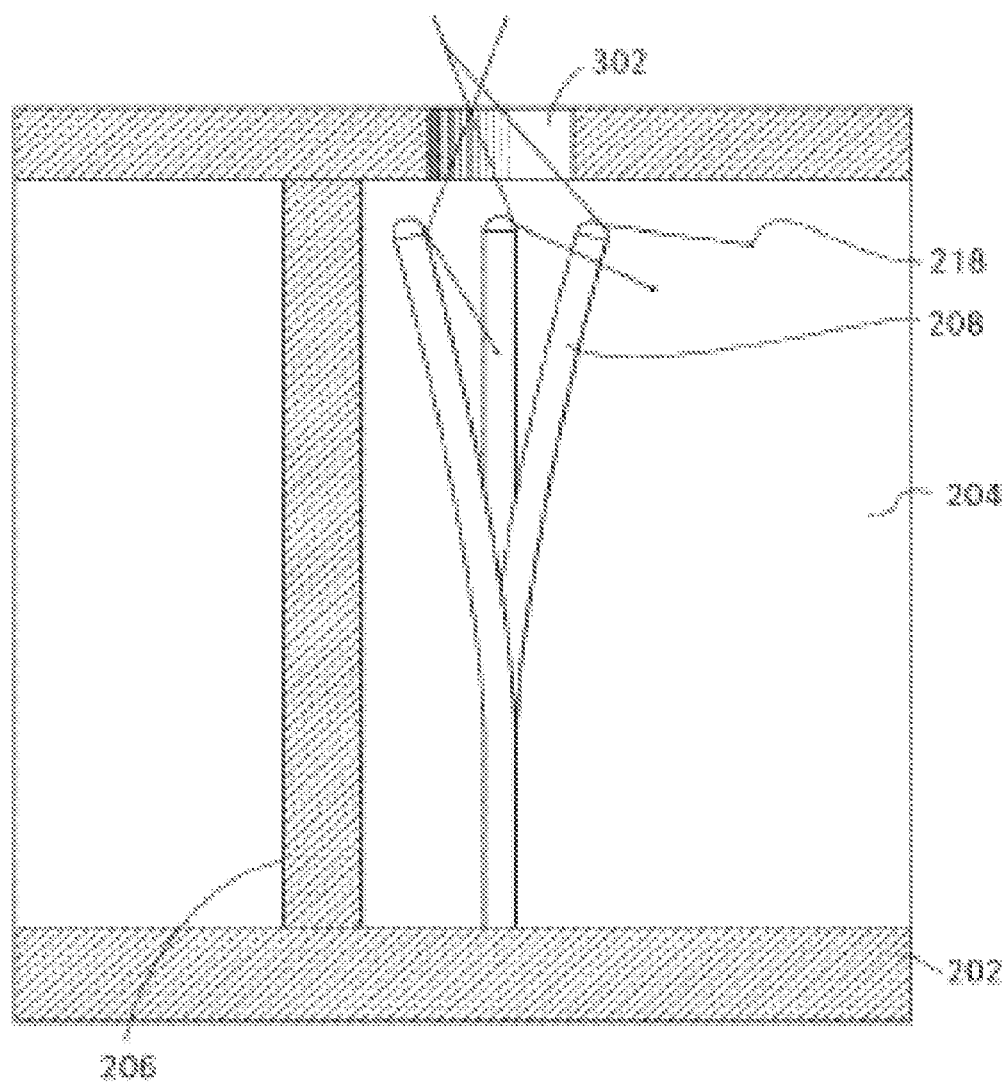

FIG. 3C depicts a cross-sectional view inside assembly 300 along segment DD of FIG. 3B showing pillar 206 and nanofilament 208 in cavity 204 of the assembly. Fluid molecules 218 enter through opening 302 and collide directly with nanofilament 208 and/or pillar 206. As with the closed-top heat pump pillar assembly shown in FIG. 2A, in the open-top heat pump pillar assembly 300, deflection of the nanofilament 208 caused by the collisions are depicted by the range of movement of the nanofilament away from its equilibrium (vertical) position.

FIG. 4A depicts a cut-away perspective view of heat pump wedge assembly 400 with nanofilaments 208 positioned proximate wedges 402. Fluid molecules 218 collide with wedges 402 and/or nanofilaments 208 and the assembly 400 is accelerated as shown by the arrow 410. The fluid flows in the opposite the direction of movement of the assembly 400. As with the other assemblies described herein, the nanofilaments 208 vibrate in the presence of heat.

Figure 4B:
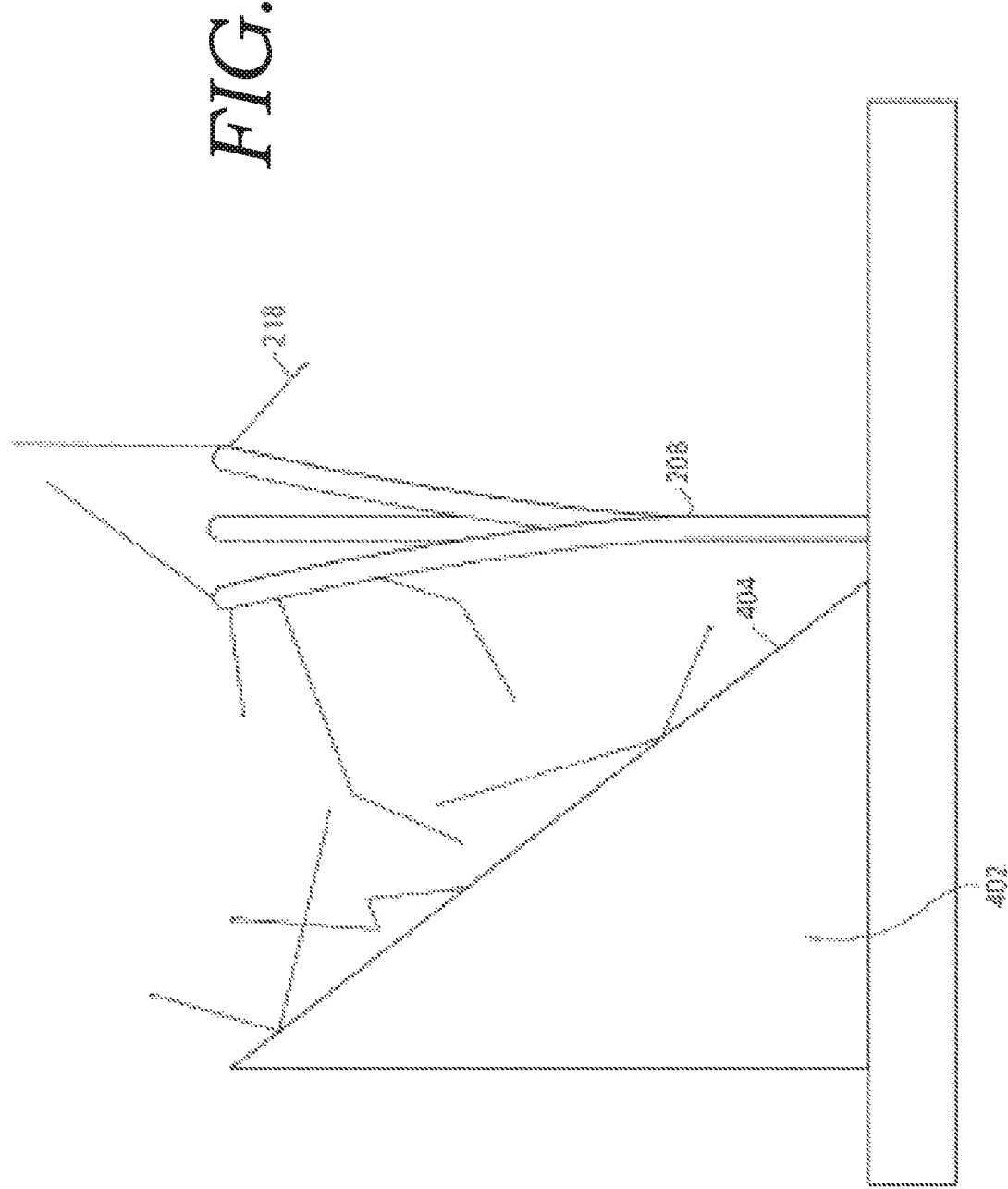

Fluid molecules colliding with the moving tip of nanofilaments 208 are struck as depicted in FIG. 4B, just as a bat strikes a baseball. As can be seen (and as oriented) in FIG. 4B, molecules 218 approaching the nanofilament 208 from the right will be hit back toward the right, gaining kinetic energy, while molecules approaching the nanofilament from the left will be hit back toward the left. Molecules hit toward the left will hit the incline 404 of wedge 402 and ricochet back toward the nanofilament 208. The distance from the wedge 402 to the nanofilament 208 can be chosen so that the mean free path of air (around 60 nm), is approximately the same as or greater than the distance from the nanofilament 218 (in its equilibrium (vertical) position) to the incline 404 of wedge 402, so that most of the molecules 218 hitting the incline bounce off the incline and move toward the nanofilament 208. The net effect is fluid molecules 218 are pumped toward the right, and wedge 402 experiences a thrust toward the left, along with a small downward thrust component (under the orientation of FIG. 4B).

FIG. 5A depicts an embodiment of a closed-top nanofilament heat pump assembly that accelerates fluid molecules down a channel. Closed-top heat pump channel assembly 500 has multiple vanes 502, with nanofilaments 208 positioned in the vanes 502. Similar to the embodiment of FIG. 2A, openings 212 and 214 allow directional flow of fluid 210.

FIG. 5B depicts a cut-away perspective view of assembly 500, with cantilevered nanofilaments 208 positioned in vanes 502. Vanes 502 are coupled to cavity 204, through which fluid 210 flows from opening 212 to opening 214. Fluid molecules 218 from cavity 204 traveling toward nanofilaments 208 in vanes 502 will typically ricochet back toward the cavity 204, with the accelerated molecules exiting through opening 214.

Figure 5C:
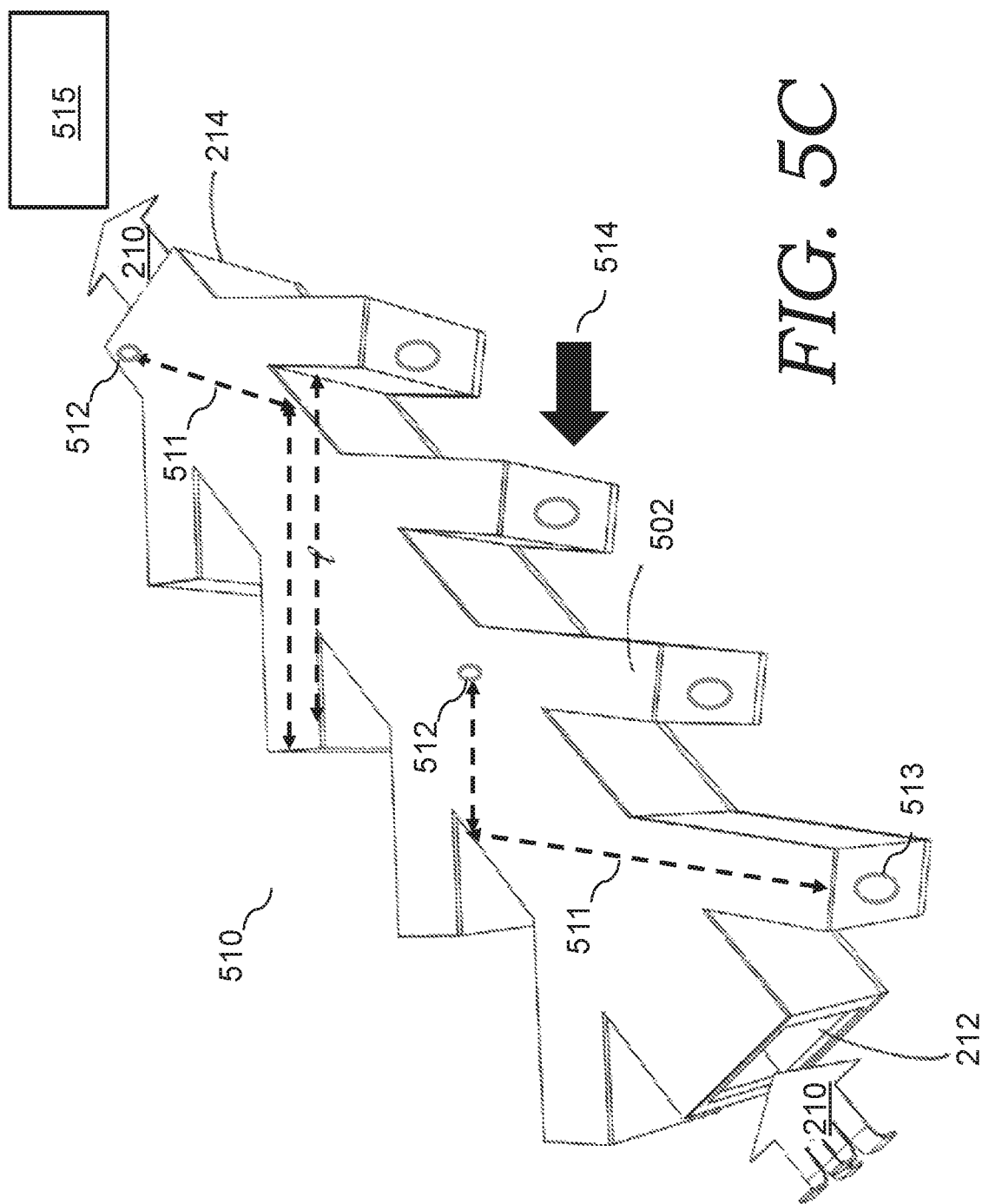
FIG. 5C depicts a view of a gas ballistic rectifier assembly.
Figure 5D:
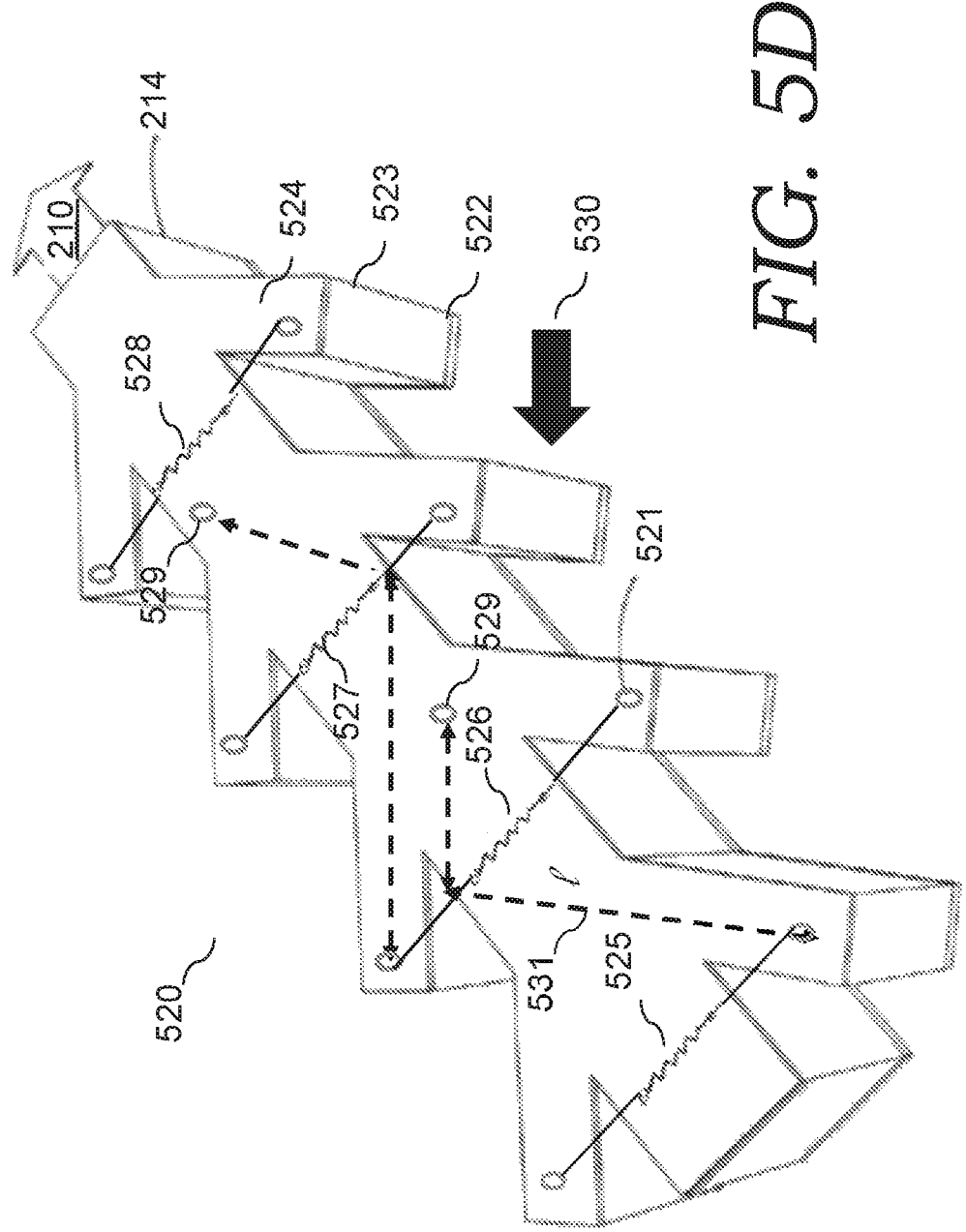
FIG. 5D depicts a view of an electrical ballistic rectifier assembly.

FIGS. 5C-5D depict energy conversion systems that employ ballistic rectifier assemblies such as those described above. A ballistic rectifier can be understood, by a simple concept; that the materials (gas molecules, electrons, etc.) behave as if they were classical Newtonian particles. Some materials (such as electrons) can respond to electromagnetic fields; but the materials otherwise travel in straight paths until they encounter obstacles, from which they are reflected. An asymmetric structure (such as an asymmetric angled structure) can deflect the particles and this causes the rectification. See A. M. Song, "Room-Temperature Ballistic Nanodevices", Encyclopedia of nanoscience and Nanotechnology, X, 1 (2004).

FIG. 5C depicts an energy conversion system that employs a gas ballistic rectifier assembly 510. If the mean free path (shown by arrows 511) of the gas molecules 512 (such as nitrogen or oxygen) is between 0.1 and 10 times the path length 1 (such as indicated FIG. 5C), the gas molecules 512 entering the holes 513 should move on average in direction 210. Since the mean free path of air at atmospheric pressure is around 60 nm, the path length should be around 60 nm. By lowering gas pressure it is possible to increase this path length and allow for larger structures.

For instance, many structures 510 such as set forth in FIG. 5C can be arranged in parallel and each feed into a turbine-generator 515 to convert the airflow (generated by heat shown by arrow 514) into an electrical output. The force due to the airflow can also be used directly to propel a vehicle. In such case, heat 514 is converted into mechanical motion.

FIG. 5D depicts an energy conversion system that employs an electrical ballistic rectifier assembly 520. G. Auton et al., "Graphene Ballistic Nano-Rectifier With Very High Responsivity," Nature Communications 7, Article number: 11670 (2016) describes how a graphene-based ballistic rectifier operates in general. If the mean free path 521 of the electron 529 (or other charge carrier) is between 0.1 and 10 times path length 1 (which is similar to the length of the graphene vane) the electrons 529 entering from the resistor terminals 531 (the resistors 525-528 generate an AC Johnson noise voltage) should move on average in direction 210. Since the mean free path of graphene 524 on top of hexagonal boron nitride (HBN) 523 (which is on top of the substrate 522, such as $SiO_2$) is around 1000 nm the path length should be around 1000 nm.

For instance, many structures 520 such as shown in FIG. 5D can be arranged in series to increase voltage and be placed in parallel to increase current. Increasing the resistance of resistors 525-528 will increase the output voltage (but not the power output since current will decrease with increased resistance). An increase power per square centimeter can be obtained by making many layers of substrate/HBN/graphene/HBN/substrate/etc.

In energy conversion system using an electrical ballistic rectifier assembly 520, heat (shown by arrow 530) is converted directly into an electrical output without the need for a turbine-generator. One application can be to convert the heat of a person's wrist/arm into an electrical output to partially or fully power a smart-watch.

If one stage (one resistor and two angled legs of graphene/HBN) takes up one square micrometer, the effective bandwidth of the ballistic rectifier is 1 GHz and each resistor is 10,000 ohms, a 1 square centimeter array (10,000 stages in series and 10,000 in parallel) will produce about 1.7 milliwatts at 4 volts (a voltage compatible with most smart-phones). For a 6×10 cm substrate (about the size of a smartphone), the single layer array should produce about 100 mW (enough to trickle charge a smartphone battery). If a 10 layer thick array that is 6×10 cm is utilized, the system should produce about 1 watt (enough to power a smartphone indefinitely).

FIG. 6A depicts an open-top heat pump channel assembly 600 with openings 602 in vanes 502 above (e.g., directly above) nanofilaments 208. Similar to the embodiment of FIG. 3A, fluid 210 flows into openings 602. This creates thermal vibrations of nanofilaments 208, and results in movement of the fluid from openings 602 to opening 214.

Figure 6B:
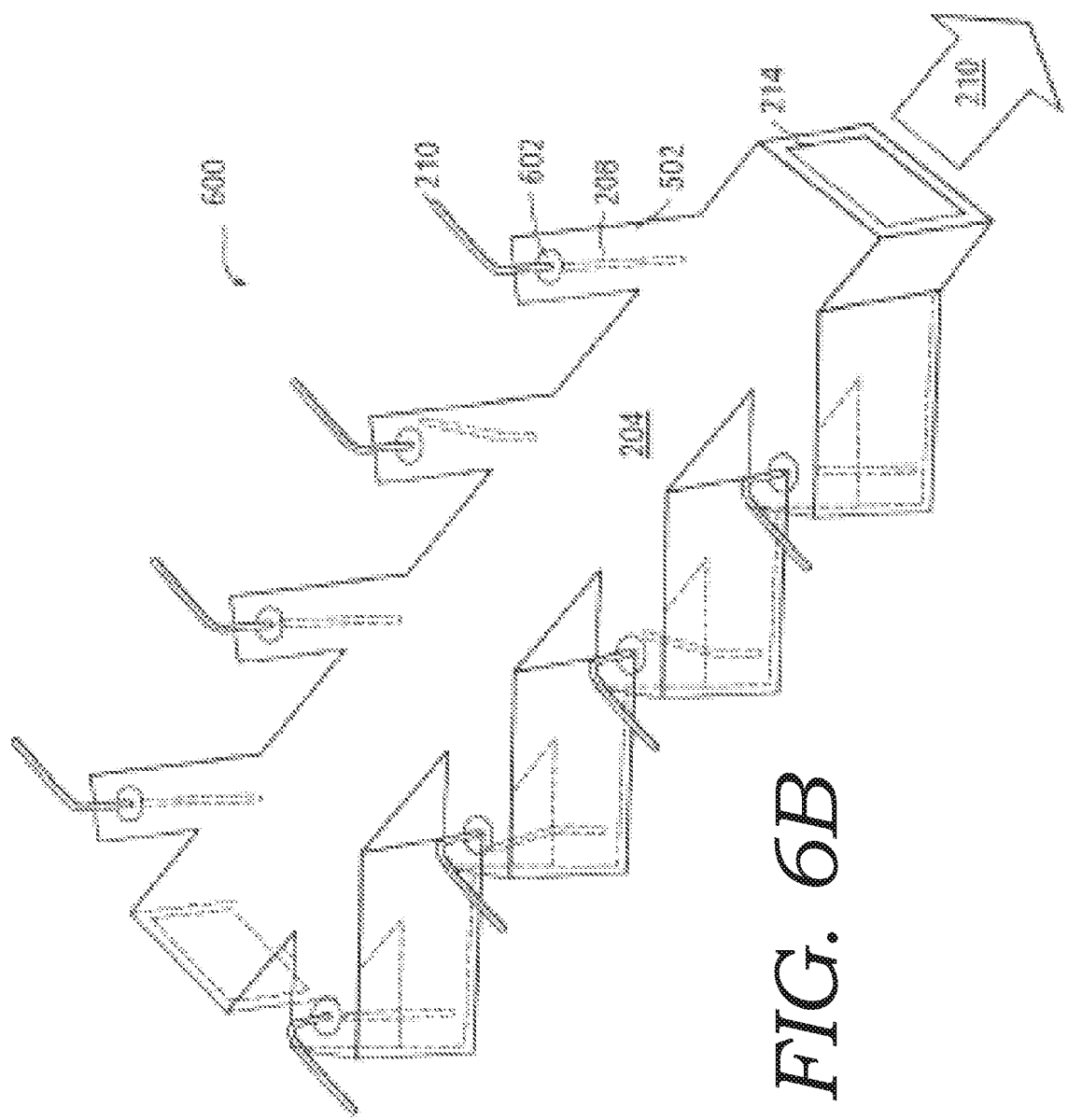

FIG. 6B depicts a partially cut-away top view of open-top heat pump channel assembly 600 with nanofilaments 208 in vanes 502 proximate cavity 204.

Thermal vibrations of the nanofilaments 208 in a nanofilament assembly (such as illustrated in FIGS. 2A, 3A, 5A, and 6A) can be augmented with an electrical input. When electrically conductive traces 216 are driven with an AC voltage, the nanofilaments 208 can be made to oscillate as they are intermittently attracted to conductive features through electrostatic attraction. The resulting vibrational amplitude of the nanofilaments 208 can greatly exceed the vibrational amplitude of nanofilaments 210 in assemblies driven by heat alone.

The pumping force (or thrust) of a charge pump assembly can be significantly higher than that of a heat pump assembly. As with heat pump assemblies, the pumping action of charge pump assemblies is derived from the ricochet action (collisions) of molecules in the cavity. The electrostatic attraction between the pillar 206 and nanofilament 208 can also be used to adjust the pumping rate due to heat. For example, the fluid flow due to heat can be slowed by applying a DC voltage between the pillars 206 and nanofilaments 208.

FIG. 7A depicts a charge pump pillar assembly 700 (closed-top). Charge pump pillar assembly 700 has body 202, cavity 204, and nanofilaments 208 similar to that of heat pump pillar assembly 200 (illustrated in FIG. 2). Nanofilaments 208 are cantilevered proximate conductive pillars 706. Conductive traces 710 are made of a conductive material such as, for example, copper. Fluid 210 enters the assembly 700 through opening 212 and is pumped through assembly 200 and out opening 214.

The pumping action is due to the electrostatic attraction of the nanofilaments 208 and the conductive pillars 706, as well as the thermal motion of nanofilaments 208 resulting from interaction between the fluid molecules (e.g., gas or liquid molecules) with the nanofilaments 208.

Figure 7B:
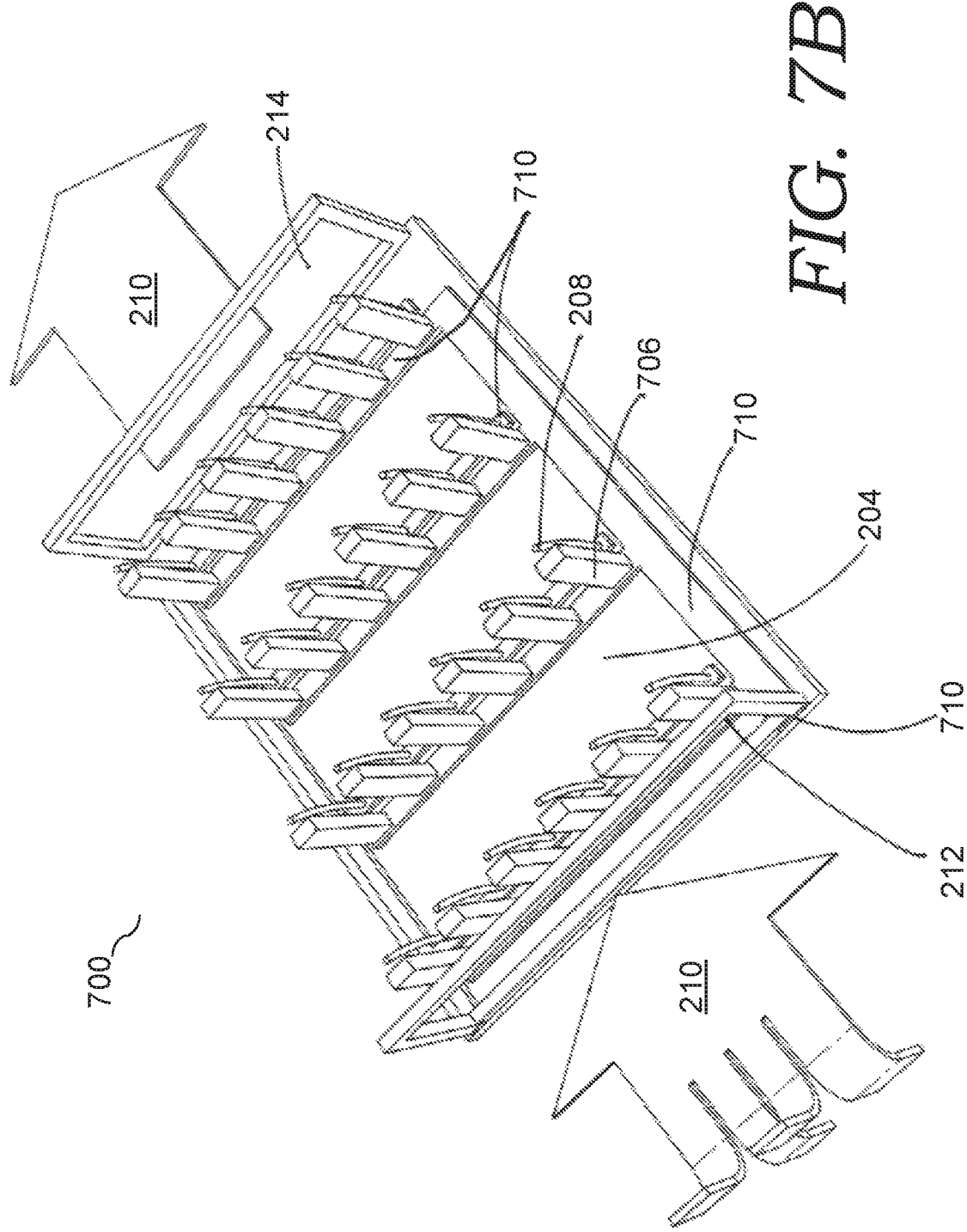

FIG. 7B depicts a cut-away perspective view of the assembly 700 with conductive pillars 706 and nanofilaments 208 in cavity 204.

As shown in FIG. 7C, motion of the nanofilaments 208 is depicted as trace 216 indicating tip displacement of the nanofilament due to thermal and electrostatic vibration of the nanofilaments is shown in FIG. 7C.

Figure 7D:
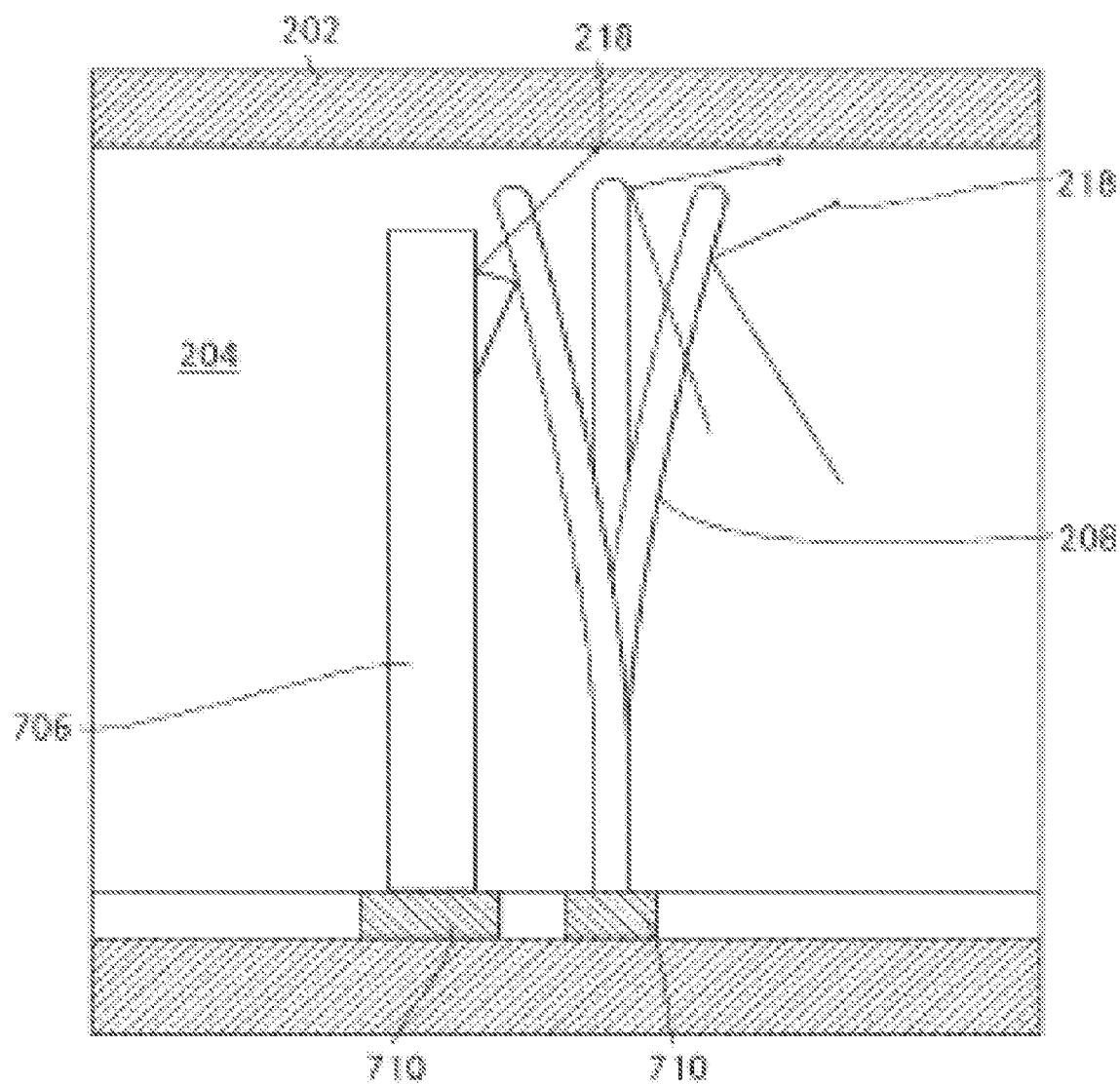

FIG. 7D depicts a cross-sectional view inside assembly 700 along segment AA of FIG. 7C of conductive pillar 706, nanofilament 208, and conductive trace 710 in cavity 204 of assembly 700. Fluid molecules 218 collide directly with nanofilament 208 and/or conductive pillar 706. Deflection of the nanofilament 208 caused by the collisions are depicted by the range of movement of the nanofilament 208 away from its equilibrium (vertical) position.

Figure 8A:
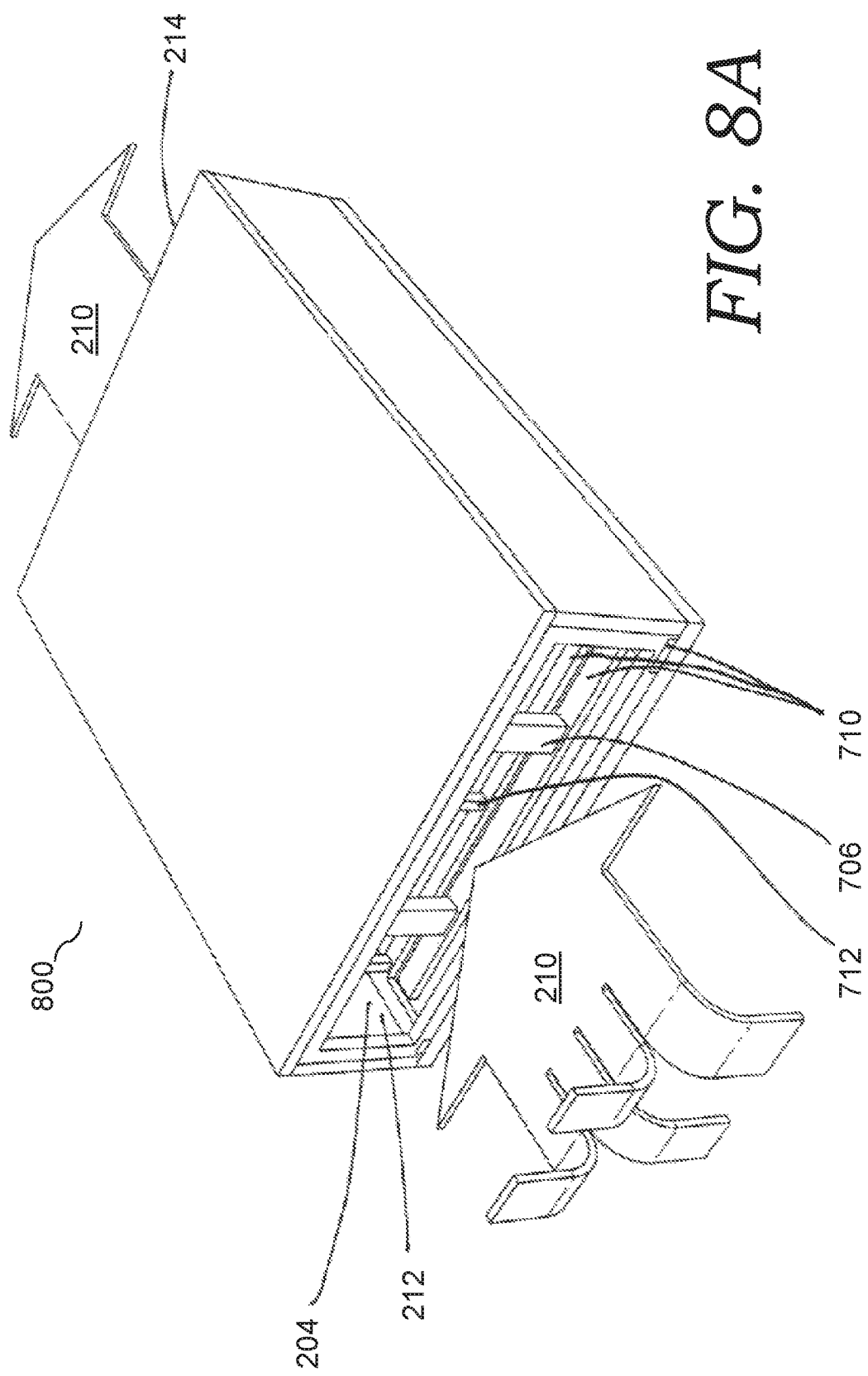

FIG. 8A depicts a charge pump jump rope assembly 800 (closed-top) with body 202, cavity 204, conductive pillars 706, double clamped nanofilaments 808 (shown in FIG. 8B), and conductive traces 710. Nanofilaments 808 are coupled to conductive supports 812, as shown in FIG. 8B. Fluid 210 flows into cavity 204 through opening 212 and is accelerated out of the cavity through opening 214. The charge pump jump rope assembly 800 functions similarly to the charge pump pillar assembly 700, with the double clamped nanofilaments 808 utilized in place of the cantilevered filaments 208.

When nanofilaments 808 are SWNTs, the amplitude of vibration can be several times the diameter of the nanofilament 808, even at room temperature in the absence of electrical augmentation. For this embodiment, SWNTs can be grown in parallel arrays and then transferred to the supports 812 as shown in FIG. 8B. See, e.g., Cao, et al. (*Advanced Materials* 2009, 21, 29-53) (including a review of methods to assemble SWNT thin films (Section 2)). There are benefits for using SWNT in certain embodiments of the present invention because SWNT are advantageously light, strong, electrically conductive, thermally conductive, and can withstand very high temperatures.

FIG. 8C depicts vibrational amplitude of nanofilaments 808 in charge pump jump rope assembly 800. (In FIG. 8C, nanofilaments 808 are illustrated in three vibrational positions; the middle of these three positions is the equilibrium (vertical) position).

FIG. 9A depicts a charge pump channel assembly 900 (closed-top). Charge pump channel assembly 900 functions similarly to heat pump channel assembly 500 (shown in FIG. 5A), with the addition of conductive traces 710 and a conductive surface 902 on vanes 502. This arrangement creates an intermittent attractive electrostatic force between the conductive surface 902 and the nanofilaments 208.

Figure 9B:
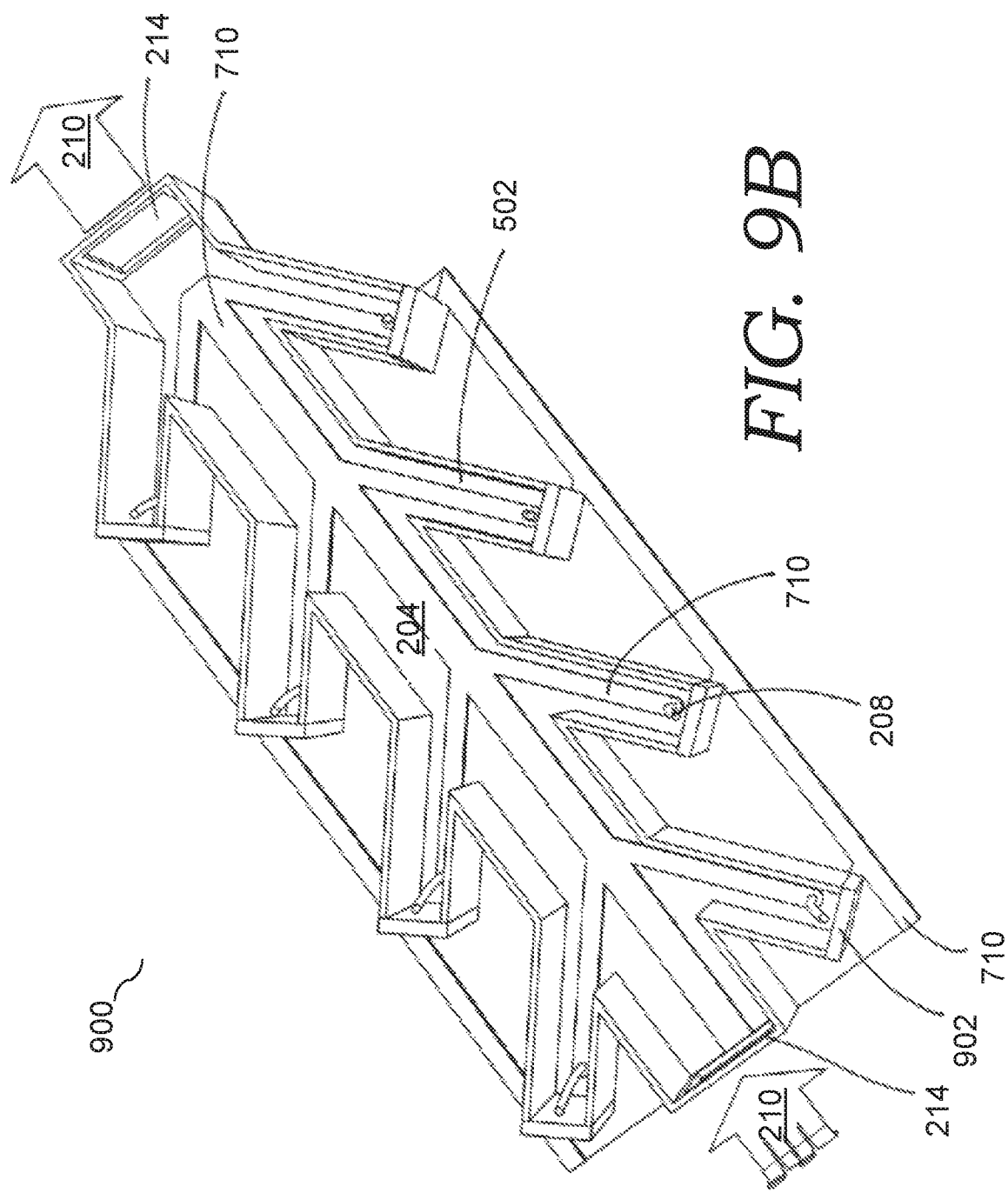

FIG. 9B is a cut-away view of charge pump channel assembly 900 showing nanofilaments 208 attracted toward conductive surface 902 of vanes 502.

In embodiments of the invention, the nanofilament pump assembly is coupled to a device. For instance, the pump assembly can be coupled to a device and utilized to generate electricity (i.e., the present invention can be utilized for generating electrical power and to convert solar energy to electrical power).

Figure 10A:
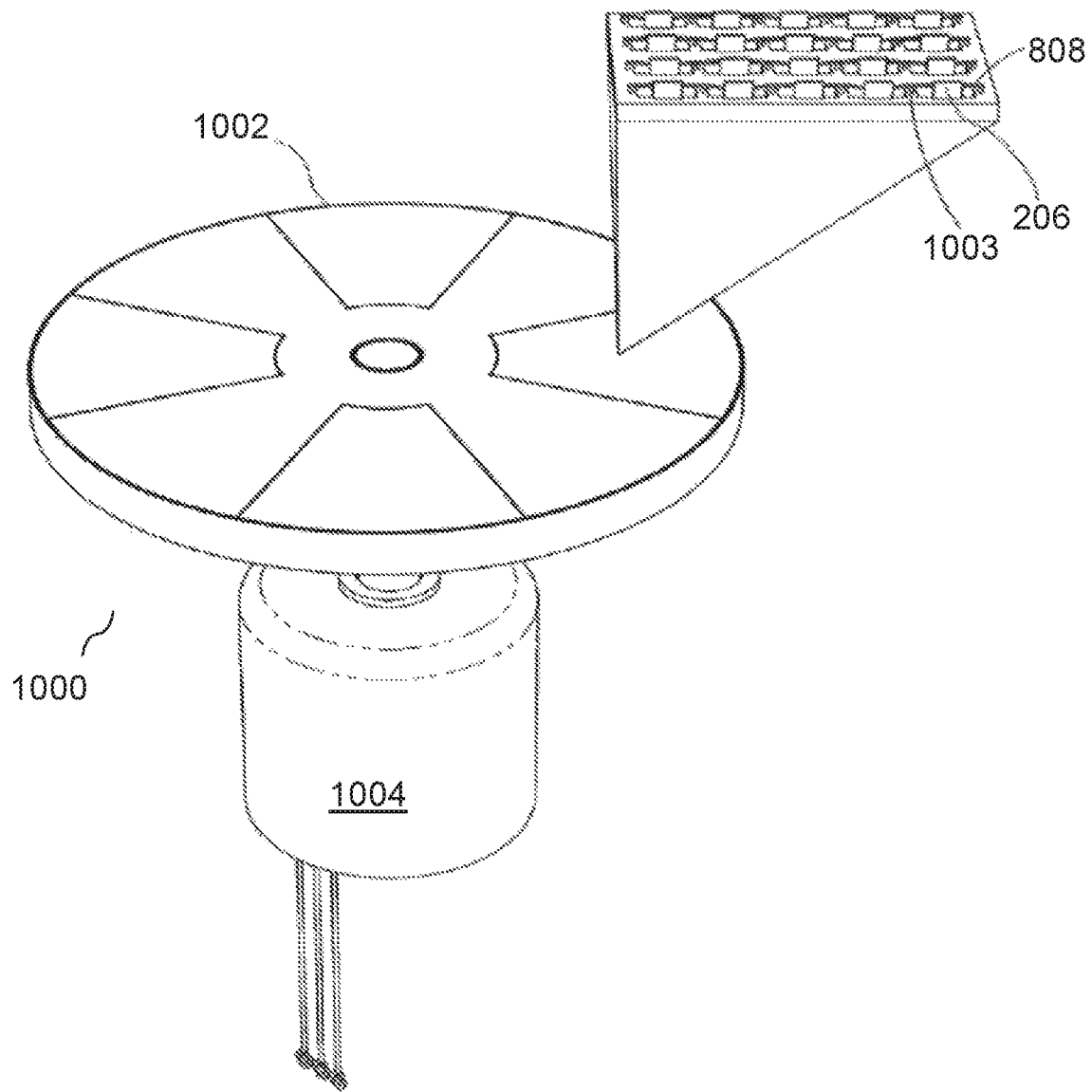
FIG. 10A-C depict apparatuses in which a nanofilament pump assembly is coupled, respectively, to a (A) an electrical generator, (B) a turbine generator, and (C) an integrated circuit.

FIG. 10A depicts rotating nanofilament pump assembly 1000. Rotating pump assembly 1000 includes a plurality (e.g., billions) of clamped nanofilaments 808 coupled to supports 1003 on disk 1002, as shown in the inset of FIG. 10. Vibration of the clamped nanofilaments 808 produces torque, which in turn can rotate the disk 1002, resulting in power output from electrical generator 1004. Assembly 1000 can be a heat and/or charge pump assembly (or other assemblies disclosed herein).

Figure 10B:
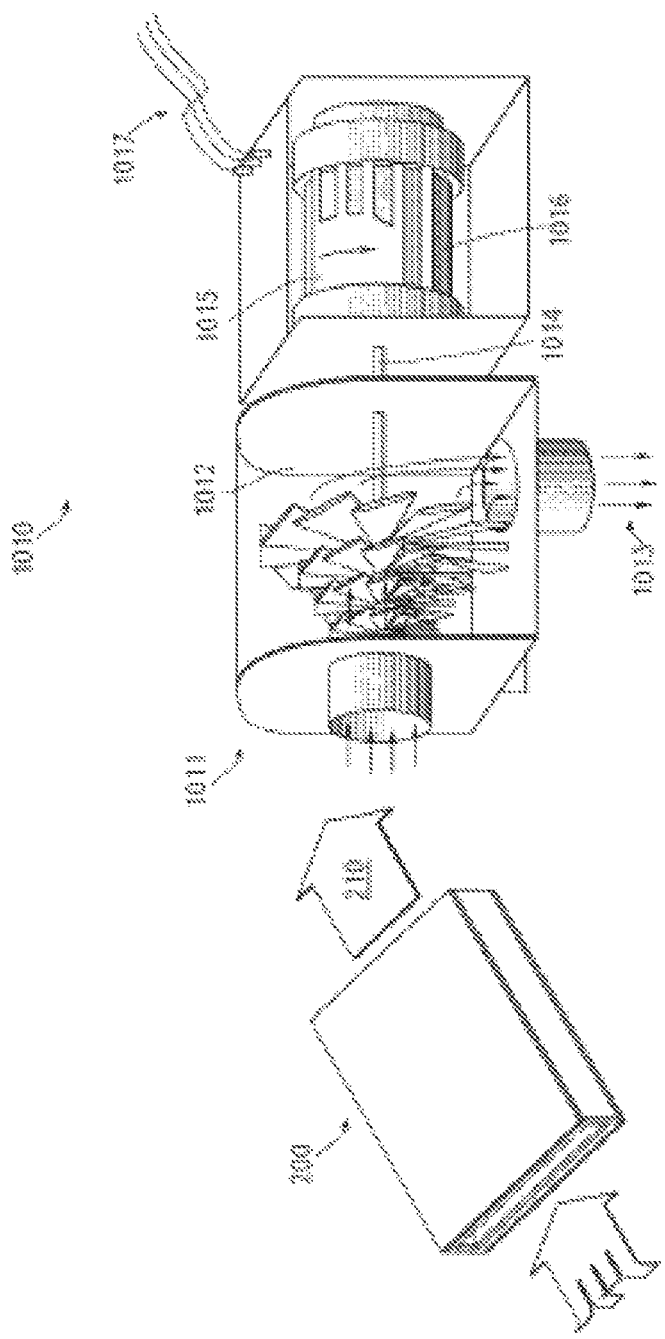

FIG. 10B depicts a stationary nanofilament pump array (such as heat pump pillar assembly 200, as depicted in FIGS. 2A-2E) operatively coupled to an turbine generator 1010. Other assemblies disclosed herein similarly can be utilized. The stationary nanofilament pump array creates a fluid flow, and the fluid 210 is fed into the fluid intake 1011 of the turbine generator 1010. The flow of fluid 210 rotates turbine blade 1012, and leaves the turbine generator 1010 at fluid outlet 1013. The rotation of the turbine blade 1012 rotates the main shaft 1014, which in turn spins the coiled wire cylinder 1015 in magnetic field 1016 generating electricity 1017.

Figure 10C:
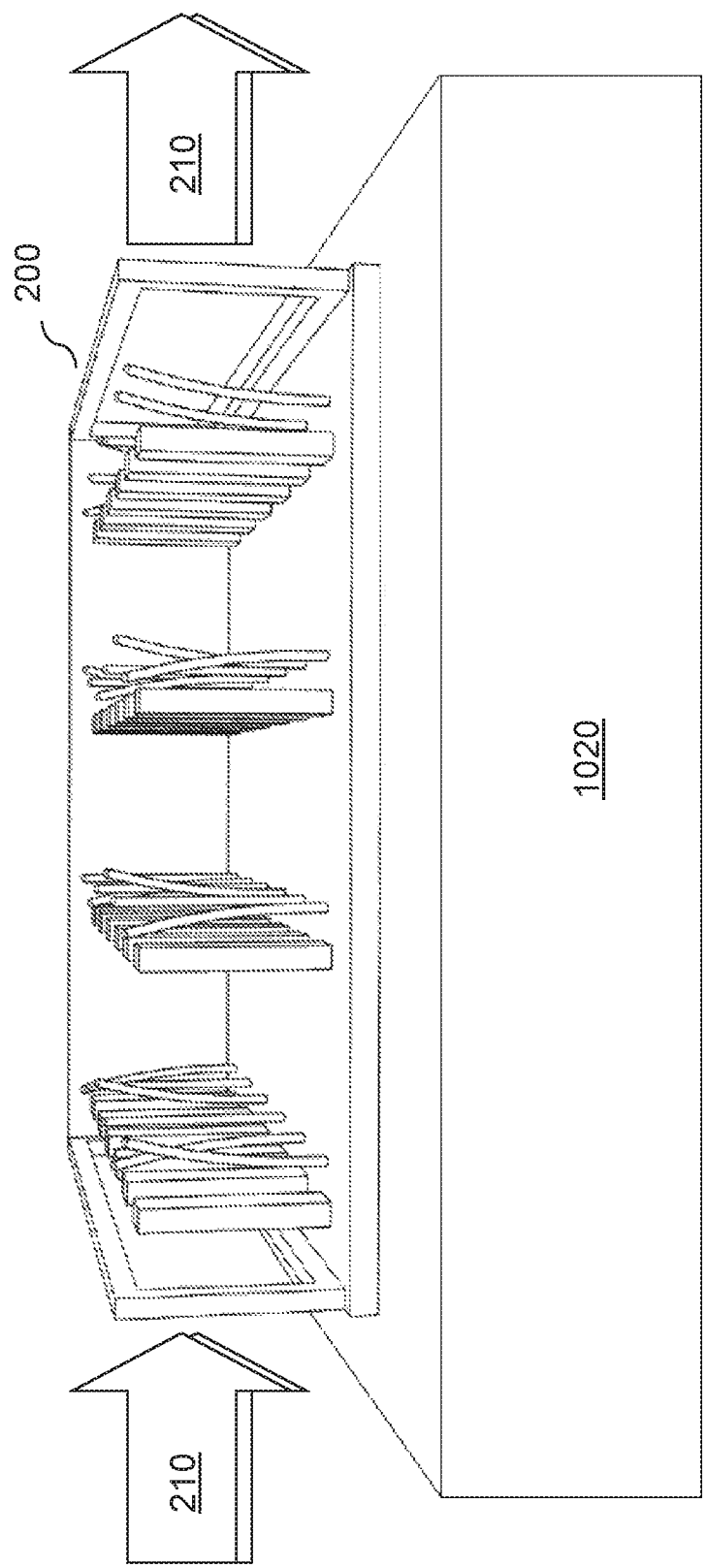

FIG. 10C depicts a stationary nanofilament pump array (such as heat pump pillar assembly 200, as depicted in FIGS. 2A-2E) operatively coupled to an integrated circuit 1020 (such as a CPU). Other assemblies disclosed herein similarly can be utilized. During normal operation, an integrated circuit can generate a significant amounts of heat. This heat must be continuously removed, or the integrated circuit may overheat, resulting in damage to the integrated circuit and/or a reduction in operating performance. Coupling an integrated circuit (or a semiconductor device, a microchip, etc.) with a nanofilament pump array allows for its cooling utilizing multiple mechanisms.

The nanofilament pump array can be positioned such that heat from the integrated circuit 1020 can be utilized as a source of the thermal force that causes the thermal vibration of the nanofilaments in the nanofilament pump array. This use of the thermal energy will act to cool the integrated circuit 1020. The nanofilament pump array can also be positioned such that the fluid flow 210 from the nanofilament pump array will itself cool the integrated circuit 1020 by transporting heat away in the fluid flow.

Figure 11A:
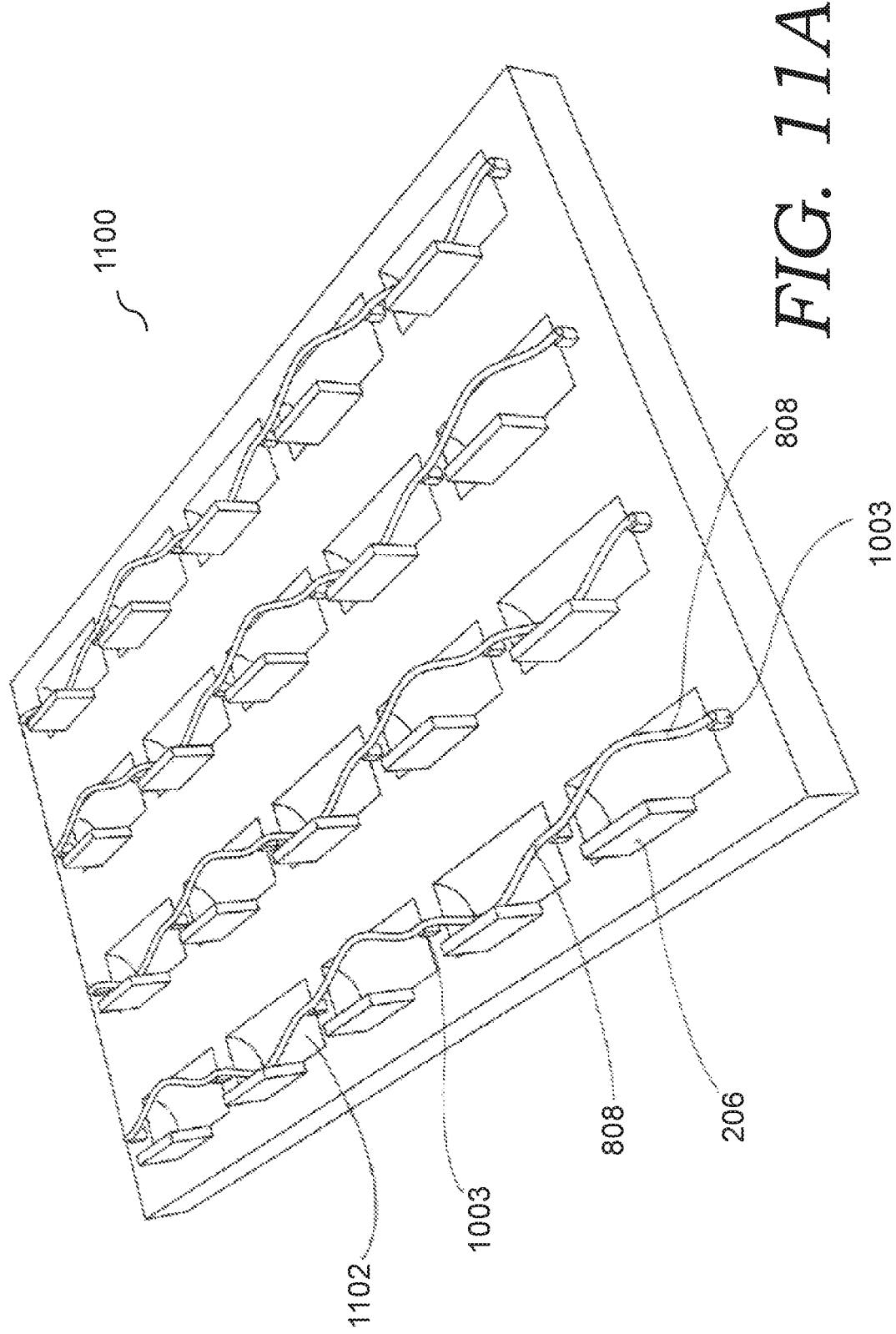
FIGS. 11A-11C depict various views of a nanofilament heat pump jump rope assembly with light focusing capability.

FIG. 11A depicts a perspective view of a portion of a heat pump jump rope assembly 1100 with a focusing portion that can be used to focus sunlight on a suspended (clamped) nanofilament. Nanofilaments 808 are connected to supports 1003 proximate pillars or walls 206. Light (e.g., sunlight) is focused on the nanofilaments 808 by concave reflective recesses 1102 (or an alternative focusing element) to increase the thermal input to nanofilaments 808. This increases the vibrational amplitude of the nanofilaments 808, resulting in more force/thrust/power from the assembly 1100.

Figure 11B:
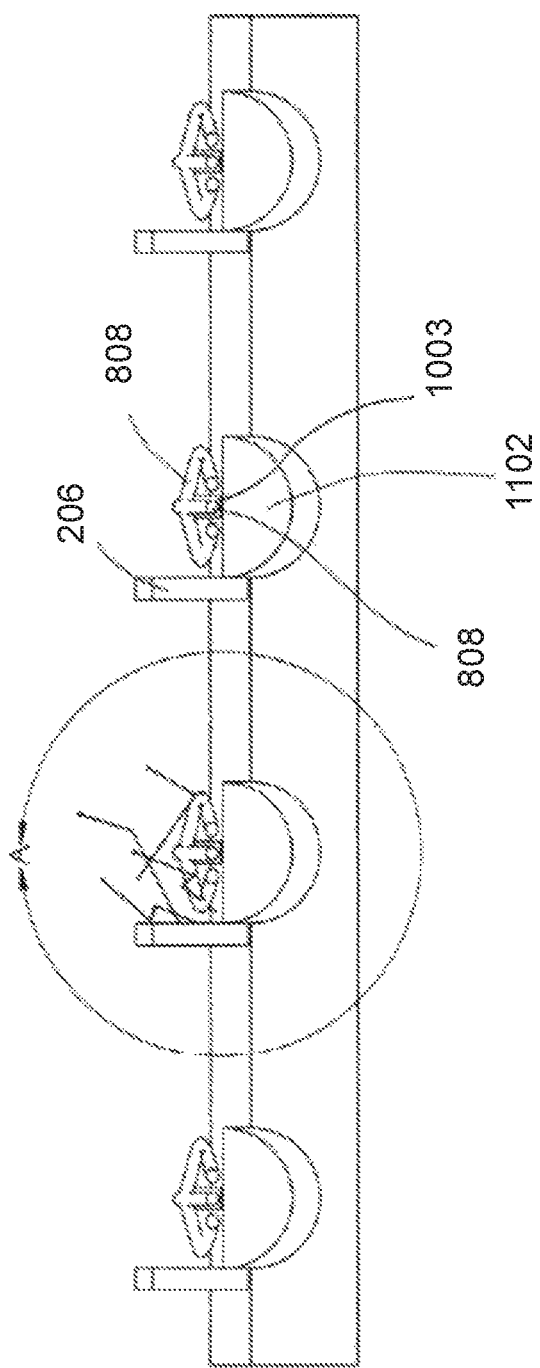

FIG. 11B depicts a cross-sectional view of a portion of assembly 1100, including nanofilament 808 (vibrational amplitude visible), wall or pillar 206, support 1003, and reflective recess 1102.

Figure 11C:
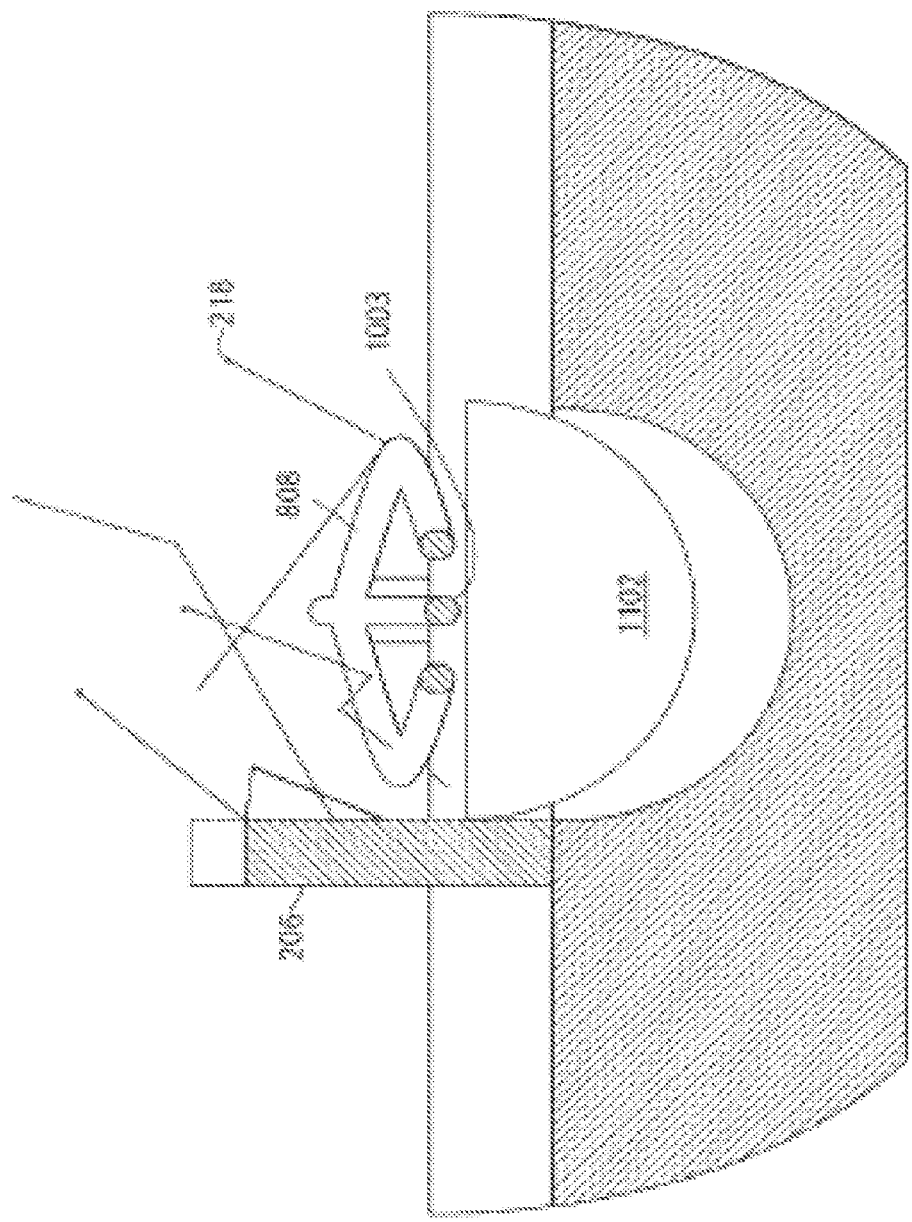

FIG. 11C is magnified cross-sectional view of a portion A of FIG. 11B. As shown in FIG. 11C, fluid molecules 218 are shown colliding with the wall or pillar 206 and the nanofilament 808.

In some implementations, the embodiments in FIGS. 10A and 11A are combined to form a photovoltaic device, such that solar energy is converted to rotation and then into electrical power.

The free end of a cantilevered molecular-scale beam or nanofilament (for example, a carbon nanotube or zinc oxide nanowire) can oscillate with an amplitude approximately equal to its own diameter based on average thermal energy of the nanofilament at room temperature. In the absence of other interactions, this thermal motion is symmetrical over time, such that an array of nanofilaments may not substantially affect the average flow of a surrounding fluid (gas or liquid). When molecular-scale objects are in close proximity (e.g., within a few nanometers of each other), however, dipole-dipole interactions know as van der Waals (VDW) forces create an attractive force between the objects. For example, if the tip of a nanofilament is passed within a few nanometers of a sharp edge, the nanofilament will resist being pulled away from the edge. This effect can be increased by placing an electric voltage across the nanofilament and edge, such that opposite electric charges on the nanofilament and the edge increase the attractive force between the nanofilament and the edge.

VDW forces (and electrical forces, if present) near an edge can affect the symmetry of the thermal motion of a nanofilament in close proximity to the edge. Asymmetry introduced by VDW forces, electrical forces, or a combination thereof, can be designed such that the thermal motion of some nanofilaments in a pump assembly can be restricted relative to that of others to create a pumping action.

Figure 12A:
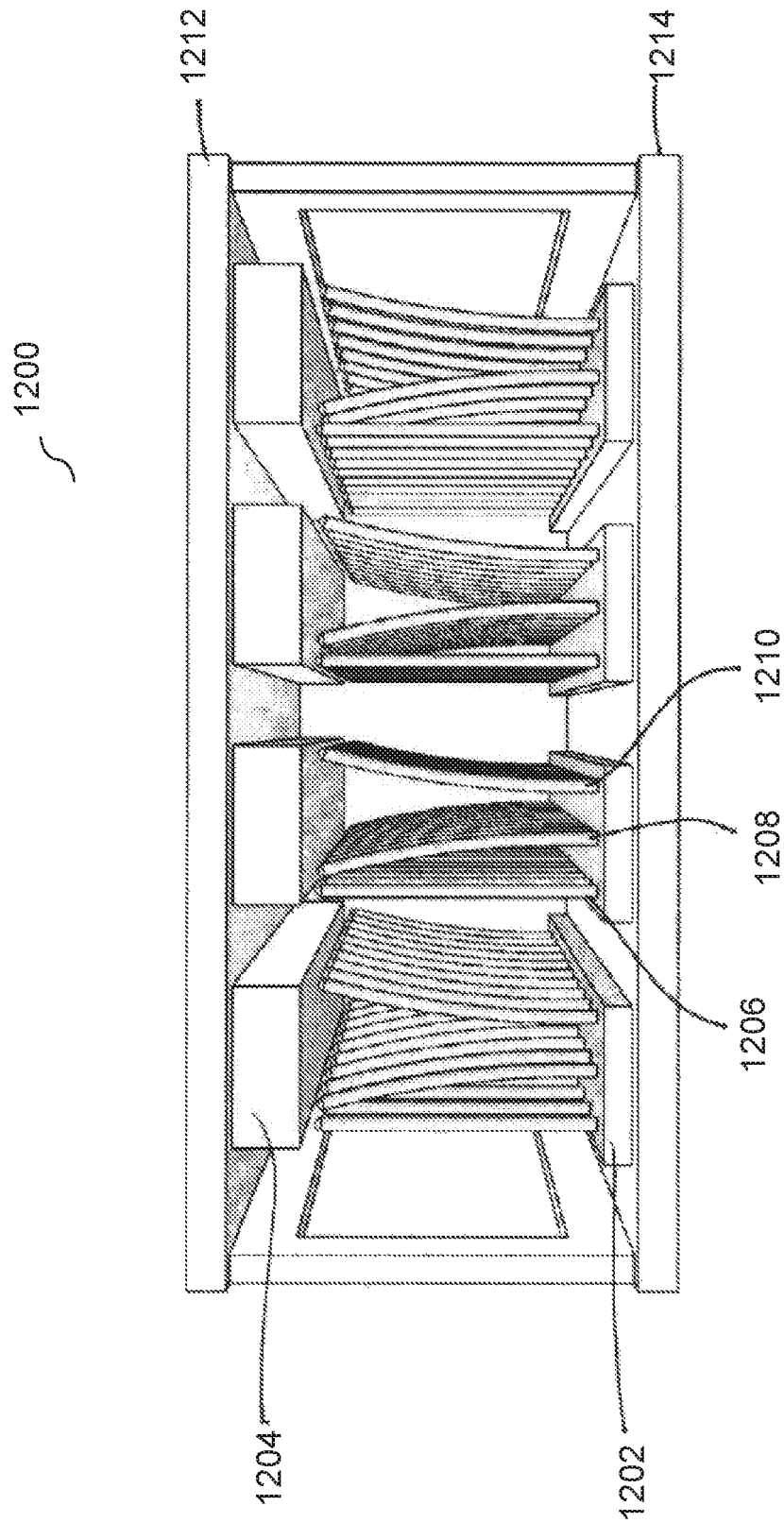
FIGS. 12A-12B depict two views of a pump assembly with van der Waals interactions.

As depicted in FIG. 12A, pump assembly 1200 includes nanofilaments (1206, 1208, and 1210) coupled to lower trace 1202 (on bottom portion 1214) and positioned beneath upper trace 1204 (below top portion 1212). The nanofilaments 1206 on the left portion of the lower trace 1204 demonstrate limited bending to the left, due, for example to VDW edge effect forces between the nanofilaments (1208 and 1210) and the upper trace 1204. In contrast, the nanofilaments 1208 in the middle portion or nanofilaments 1210 in the right portion of the trace are able to oscillate substantially symmetrically toward the left and right.

Figure 12B:
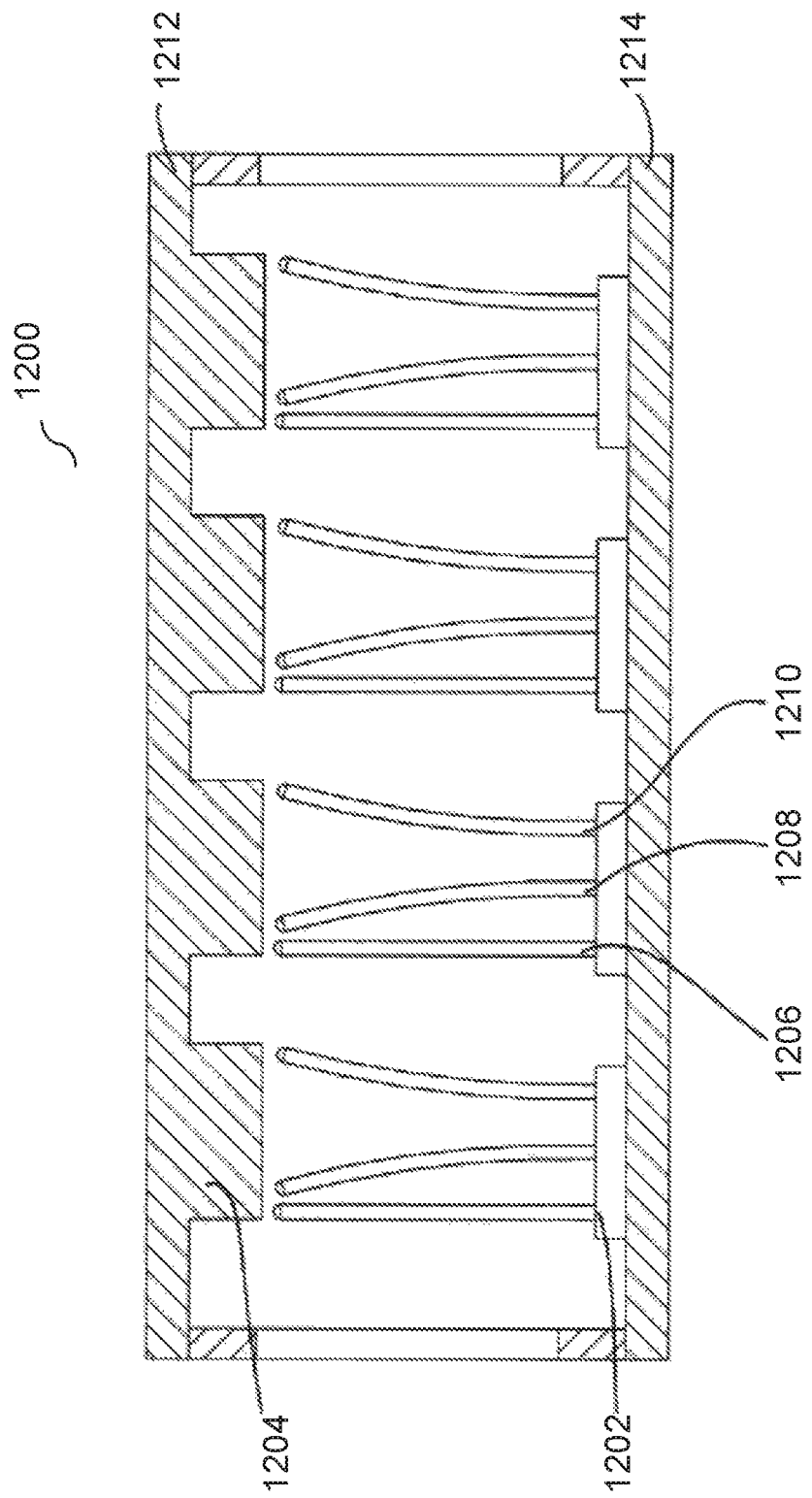

As seen in the cross section of pump assembly 1200 in FIG. 12B, the tips of nanofilaments 1206 are closer to the edge (in this case, the left edge) of element 1204 (when in an unbent position) than the tips of nanofilaments 1208 and 1210, positioned toward the center and right of trace 1202, respectively. The thermal motions of the tips of nanofilaments 1206 interact with the edge of 1204 due to VDW forces, but nanofilaments 1208 and 1210 are positioned so that their thermal motions do not interact substantially with an edge of element 1204.

The asymmetry in nanofilament motion will tend to pump a fluid from left to right in the pump assembly shown in FIGS. 12A and 12B. For example, if a gas molecule traveling at higher than the average velocity from right to left hits nanofilament 1206, the nanofilament will move slightly to the left before being deflected to the right by forces, including VDW interactions. Nanofilament 1206 thus bends toward the right and impacts gas molecules (i.e., the gas molecules collide with the nanofilament), accelerating the molecules toward the right. After a time, nanofilament will move back toward the left due to the mechanical spring force of the beam itself. The movement of the nanofilament toward the left has a lower velocity than the movement of the nanofilament toward the right, such that the gas molecules hit by the nanofilament moving toward the left accelerate toward the left at lower rate than the molecules accelerated toward the right. After a few cycles of nanofilament oscillation, the amplitude of the nanofilament tip motion will decrease, and asymmetrical pumping action is reduced.

If a gas molecule traveling at higher than average velocity from left to right hits a nanofilament with a tip that is located near left edge of elevated trace in FIGS. 12A and 12B (e.g., nanofilament 1206), the nanofilament will move to the right before being deflected toward the left by the mechanical spring force of the nanofilament. The nanofilament may hit gas molecules while moving toward the right, thereby accelerating these molecules toward the right. After a time, this nanofilament will move back toward the left (e.g., due to the mechanical spring force of the nanofilament) at a velocity lower than that of the movement toward the right, so that the gas molecules hit by the beam accelerate toward the left at a lower rate than the gas molecules accelerated toward the right. Nanofilaments closer to the center and the right edge of the lower trace 1202 (e.g., nanofilaments 1208 and 1210) will experience more symmetrical tip motion and therefore not contribute substantially to a net pumping action.

In some embodiments, moving a top portion 1212 of the pump assembly 1210 toward the left or right with respect to the bottom portion 1214 will affect the pumping action. For example, the direction of the pumping action can be reversed by moving the top portion 1212 to the left relative to the bottom portion 1214.

Figure 13A:
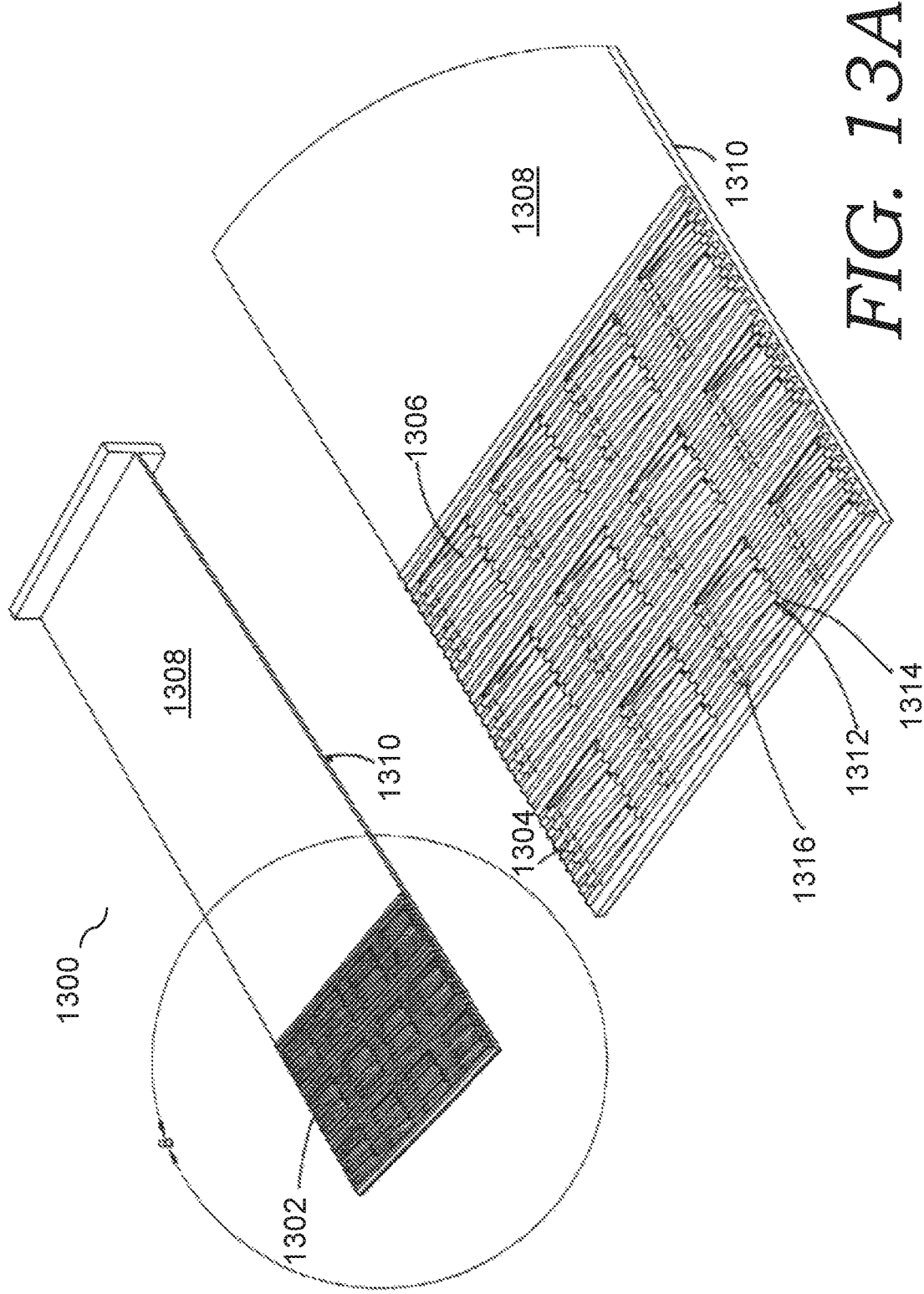
FIGS. 13A-13C depict views of a pump assembly with molecular-scale beams aligned on a conductive plate.

FIG. 13A depicts pump assembly 1300 in which a parallel array 1302 of conductive nanofilaments 1304, windows 1306, and conductive plates 1308 and 1310 are arranged to achieve a controllable pumping action. Each of the cantilevered nanofilaments 1304 has a free (e.g., unattached) tip 1312 that is closer to the top edge 1314 of the window 1306 than the bottom edge 1316 of the window 1306. When the nanofilaments 1304 vibrate with heat or are struck with fluid molecules of above average velocity, the tips 1312 can move down into the middle of the window 1306 (e.g., between conductive plates 1308 and 1310). VDW forces inhibit the tips 1312 from moving substantially above the window 1306.

Pump assembly 1300 allows asymmetrical oscillation of nanofilaments 1304. The asymmetrical oscillation will tend to pump surrounding fluid molecules down through the window 1306 and create an upward thrust from conductive plate 1310 toward conductive plate 1308.

Figure 13B:
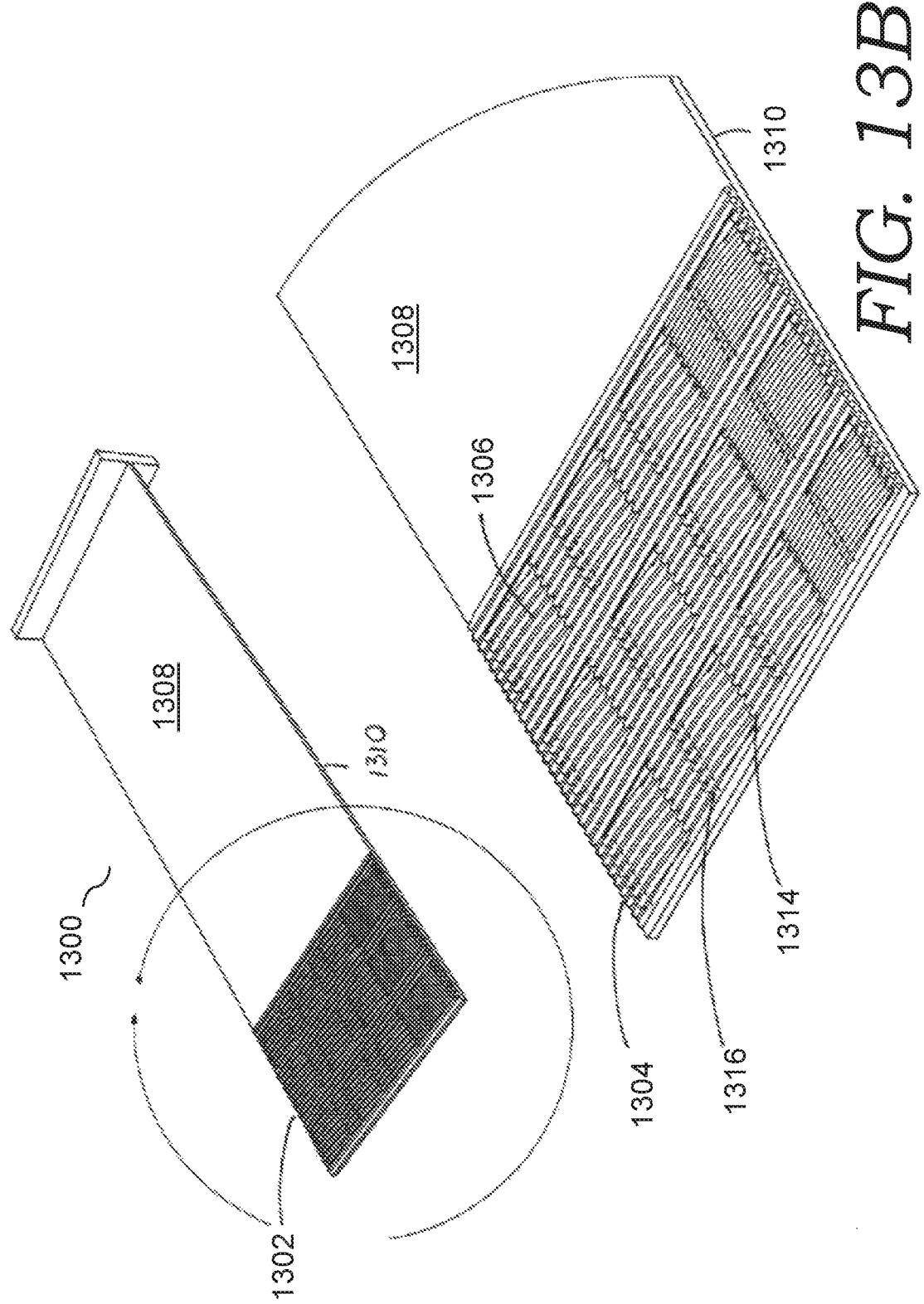

As depicted in FIG. 13B, when a DC voltage of sufficient magnitude is placed across the two conductive plates 1308 and 1310, nanofilament 1304 (which is in electrical contact with conductive plate 1308) will deflect through window 1306, due to electrostatic forces between the nanofilaments 1304 and the conductive plate 1310 (or bottom electrode). The DC voltage alters the movement of the nanofilaments 1304, and thus alters the pumping action. The DC voltage across conductive plates 1308 and 1310 can be selected to increase, decrease, reverse, or substantially stop pump flow.

Figure 13C:
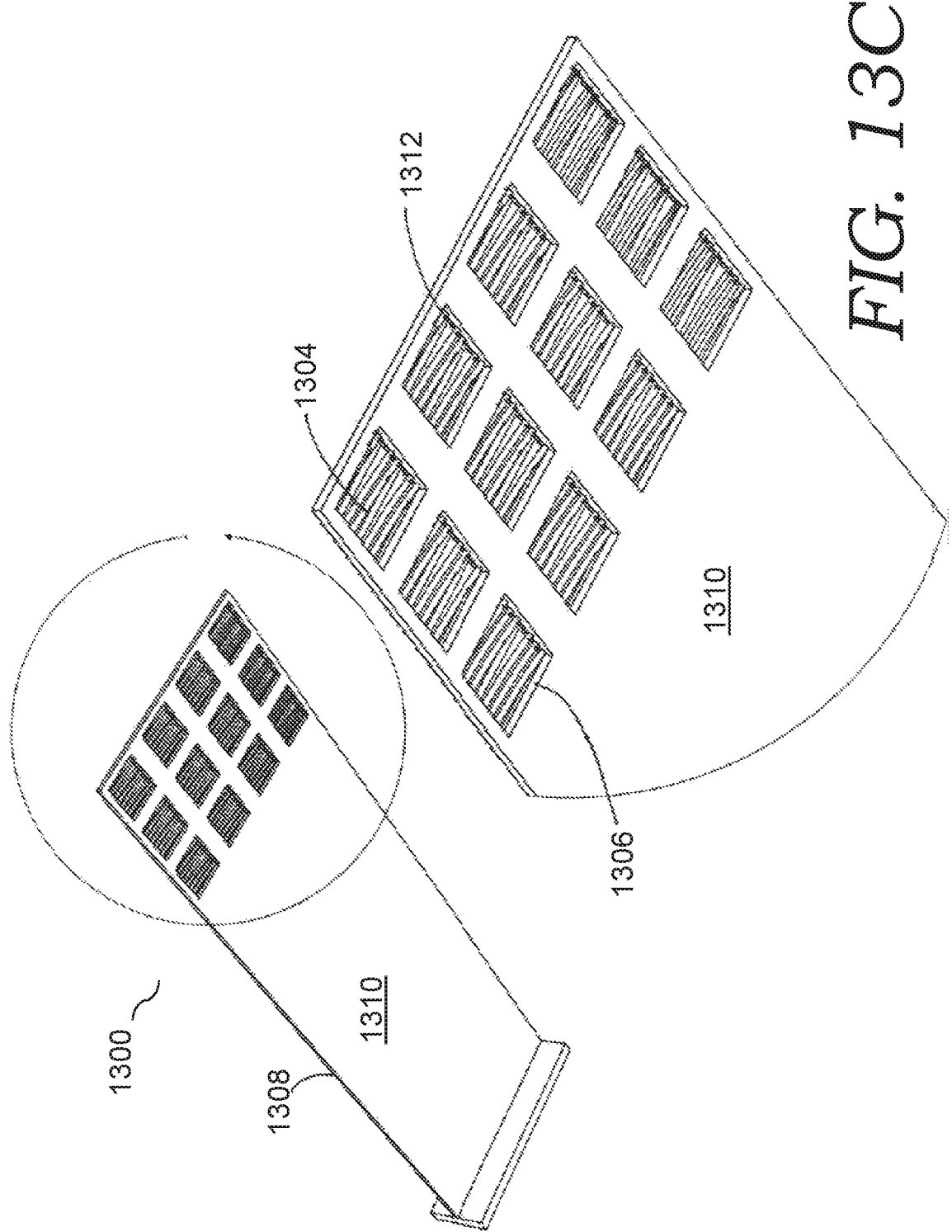

FIG. 13C is a bottom perspective view, showing conductive plate 1310, with nanofilaments 1304 (and nanofilament tips 1312) visible through windows 1306.

Figure 14A:
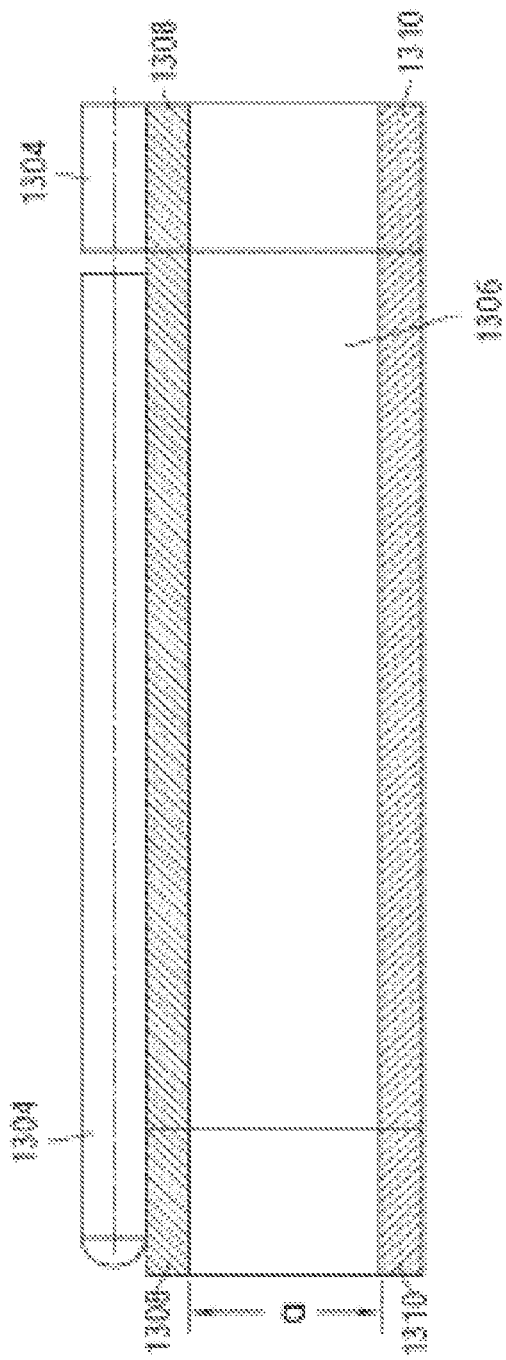
FIGS. 14A-14C is a cross-sectional view of a nanofilament proximate a window, as shown in FIGS. 13A-13C.
Figure 14B:
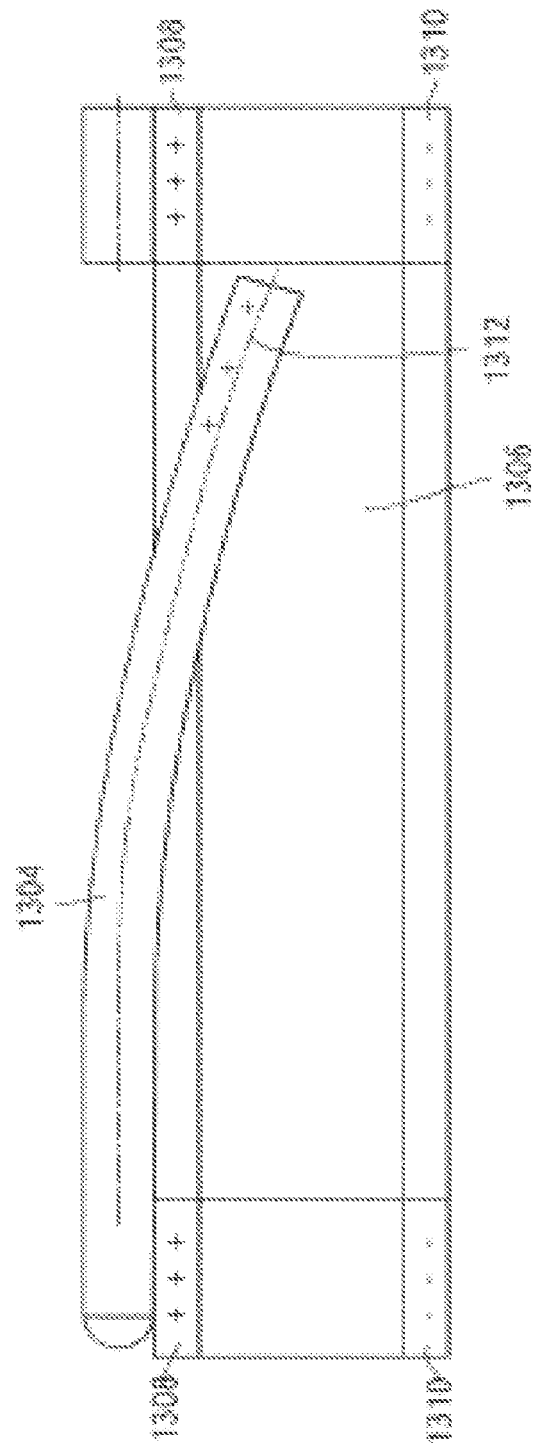
Figure 14C:
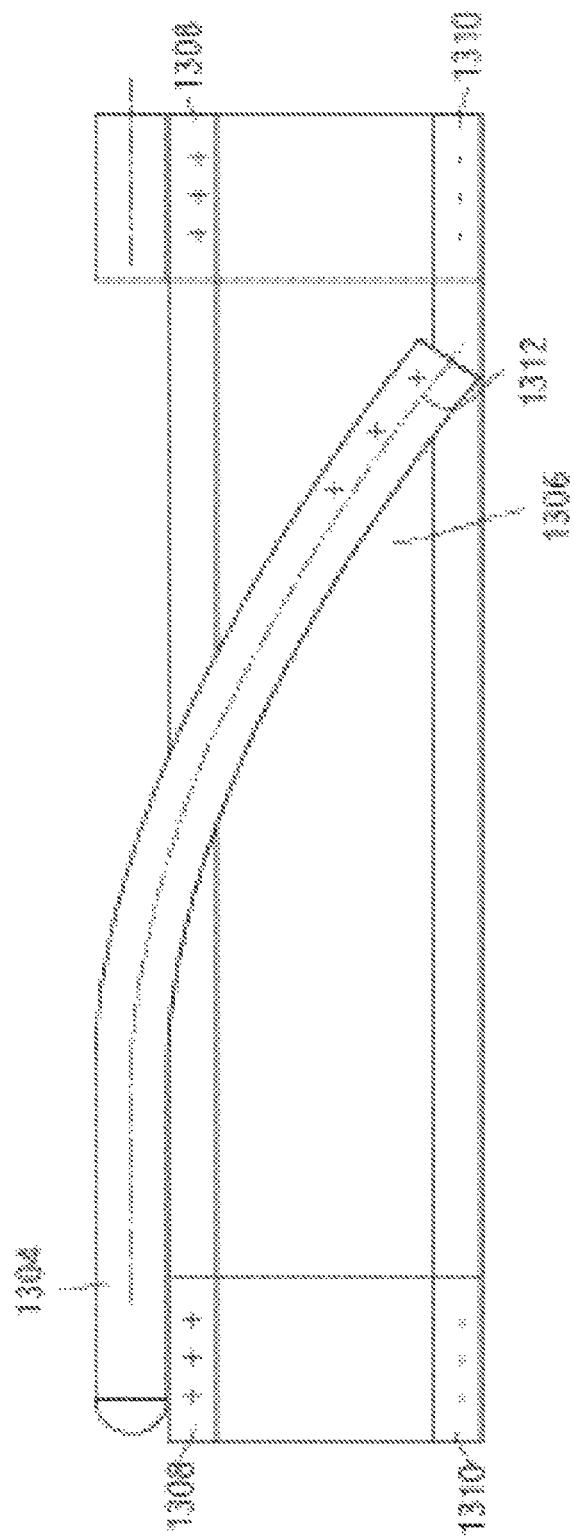

FIGS. 14A-14C show an enlarged view of nanofilament 1304 positioned on conductive plate 1308 above window 1306, as shown in FIGS. 13A-13C. Conductive plate 1308 is spaced apart from conductive plate 1310 by distance d. As seen in FIG. 14A, with no voltage across conductive plates 1308 and 1310, nanofilament 1304 is substantially parallel to the conductive plates and above window 1306.

As shown in FIG. 14B, when voltage is applied across conductive plates 1308 and 1310, nanofilament 1304 moves into window 1306 toward oppositely charged conductive plate 1310.

FIG. 14C shows nanofilament 1304 substantially fully deflected through window 1306 toward conductive plate 1310. When the potential between conductive plates 1308 and 1310 is reduced or substantially eliminated, nanofilament 1304 will move back toward the parallel position shown in FIG. 14A.

The pump assembly in FIGS. 13A-13C can be made in the following manner. Conventional lithography, etching, etc., can be used to form the windows 1306 in conductive plates 1308 and 1310 out of silicon or other suitable material. A thin coating of electrically conductive material can be applied (e.g., sputtered) on the top and bottom surface of conductive plates 1308 and 1310. Single wall carbon nanotubes (or another type of molecular-scale beam or nanofilament) can be applied to the top face of the window structure 1306 (e.g., using transfer printing, the application of a solution including nanotubes, or other suitable method). The tips 1312 of the nanofilaments 1304 can be cut near the top window edge 1314 by a using a stamp cutter or other method. In some embodiments, the gap between the nanofilament tip 1312 and the top window edge 1314 is in the range of about 0.1 nm to about 10 nm, or about 1 nm.

In some embodiments, molecular-scale beams for pump assemblies are cylindrical or otherwise curved. In other embodiments, molecular-scale beams for pump assemblies are not intentionally curved (e.g., substantially rectangular, planar, etc.), and can include sheets or flakes of a thin material (e.g., graphene).

FIGS. 15A-15E depict fabrication and operation of pump assembly 1500 with planar molecular-scale beams.

Figure 15A:
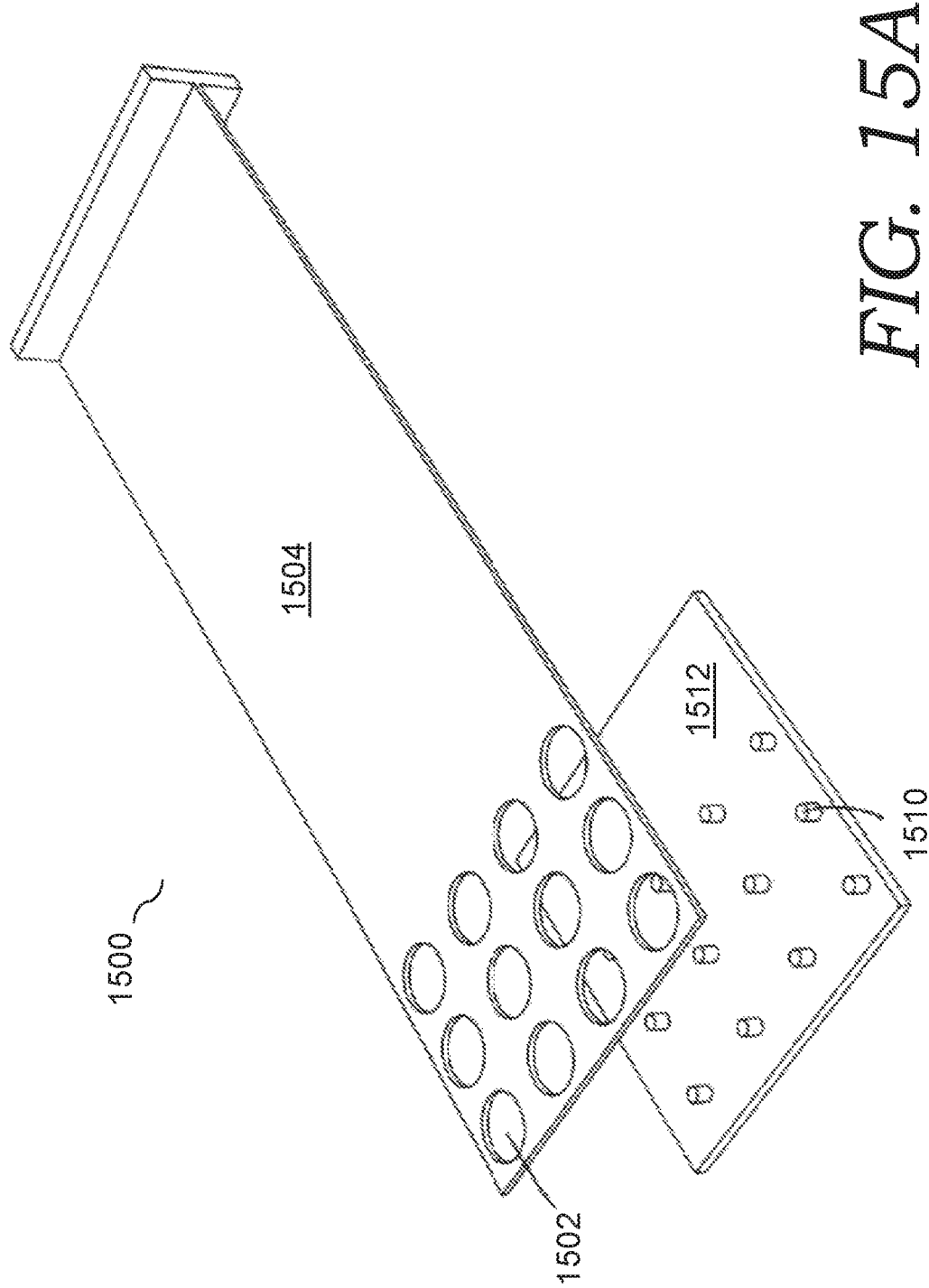
FIGS. 15A-15E depict views of a pump assembly with planar molecular-scale beams.
Figure 15B:
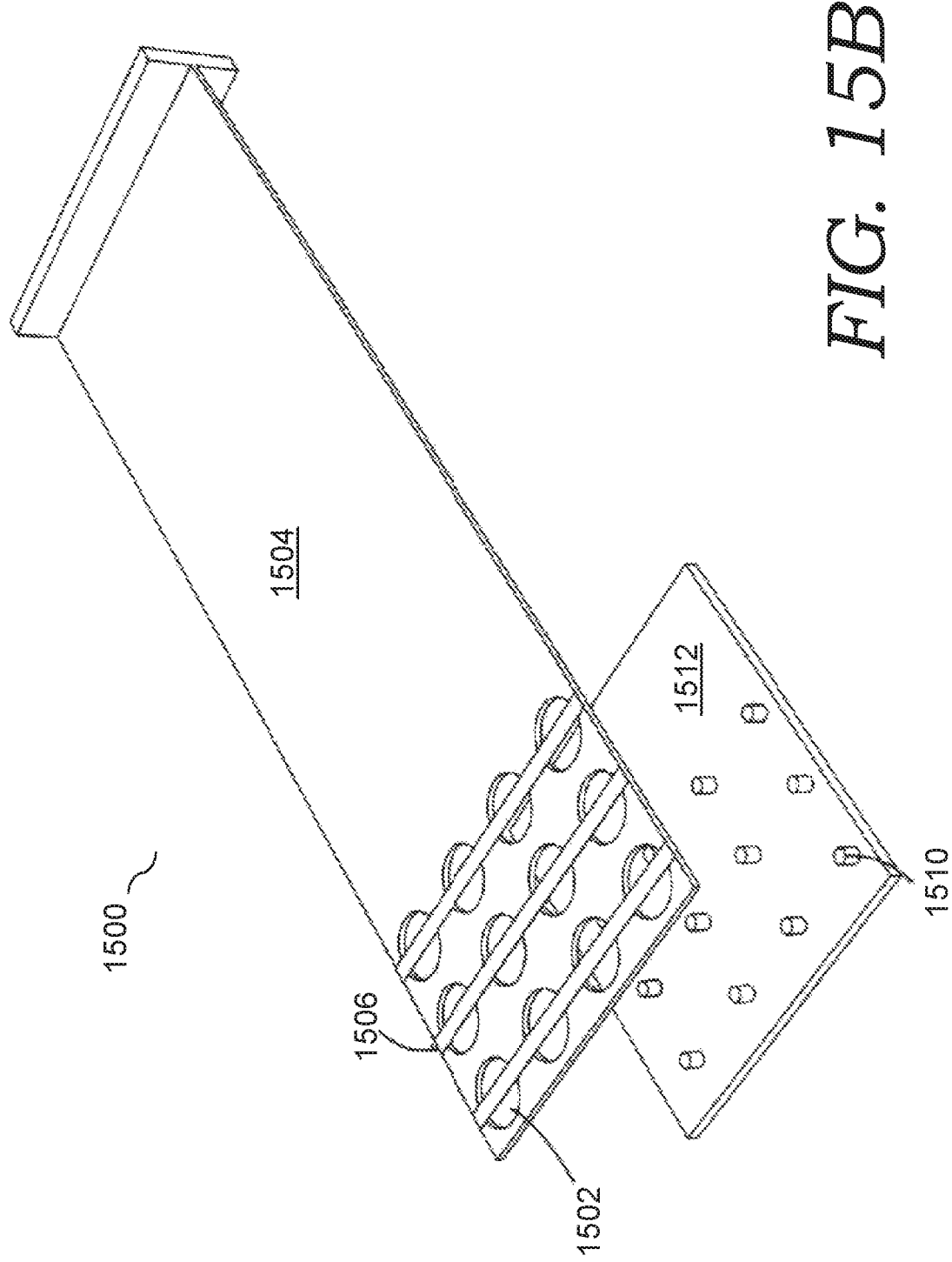
Figure 15C:
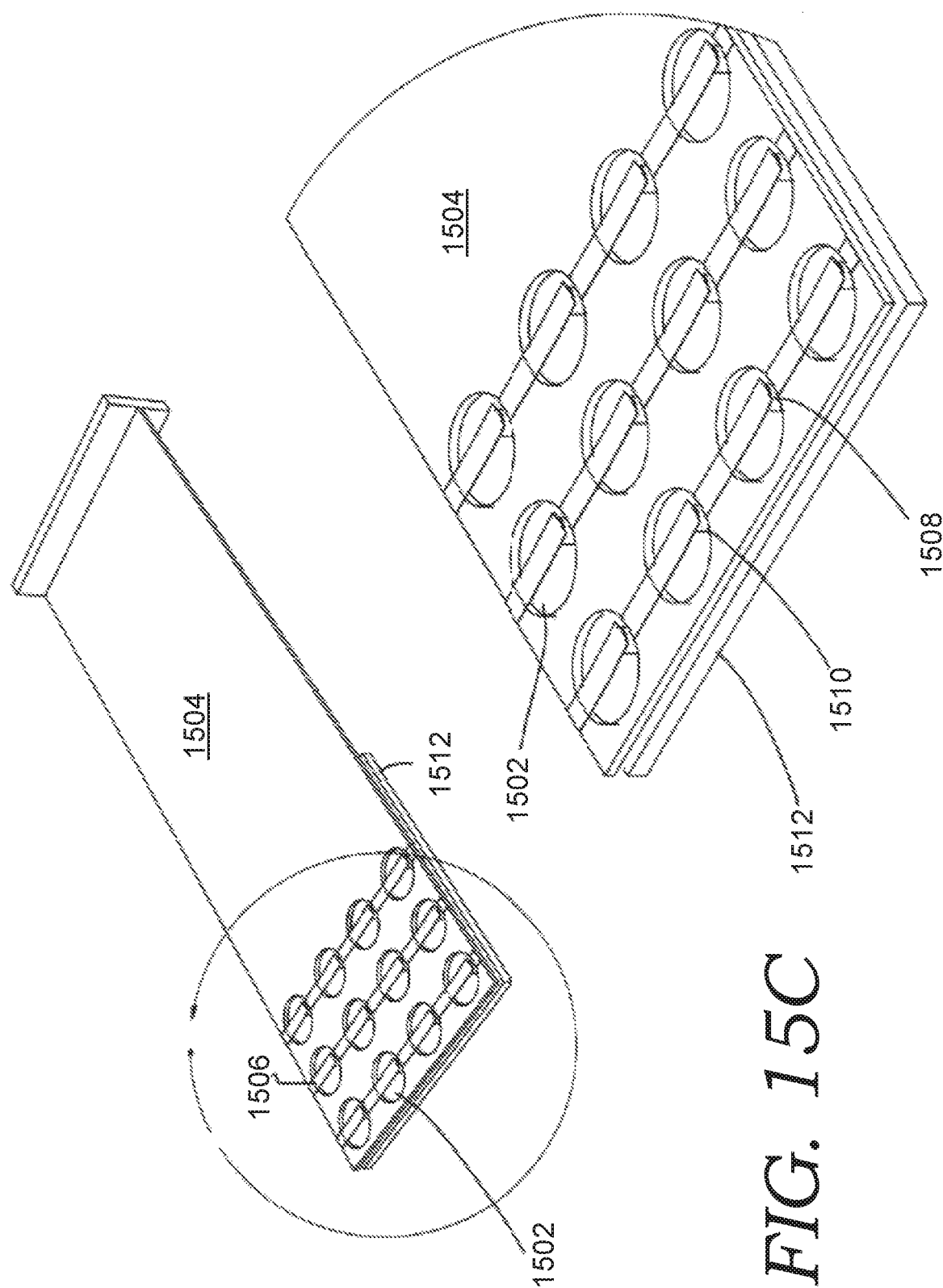
Figure 15D:
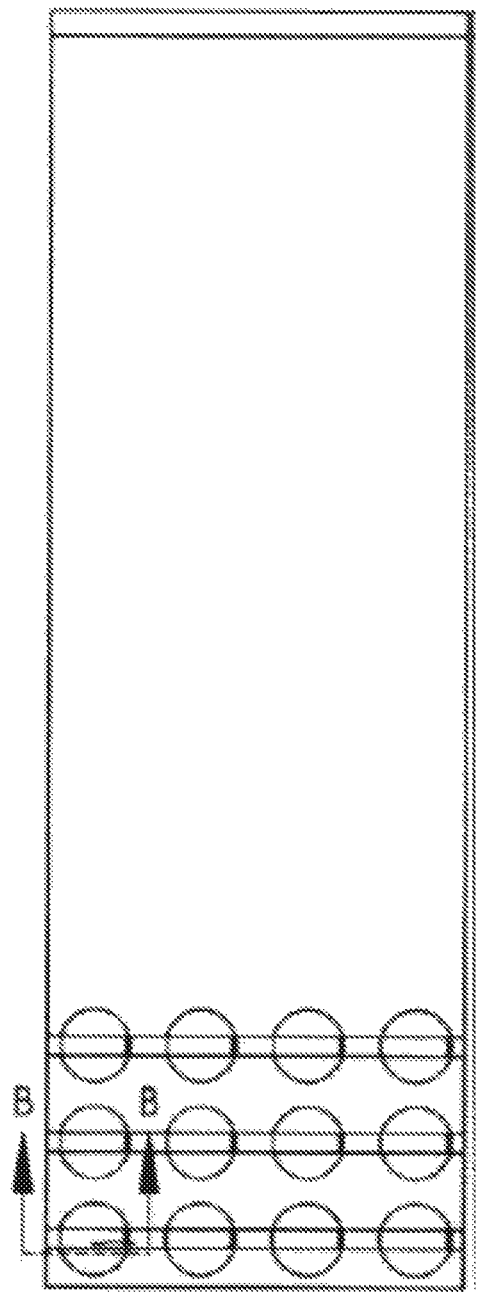
Figure 15E:
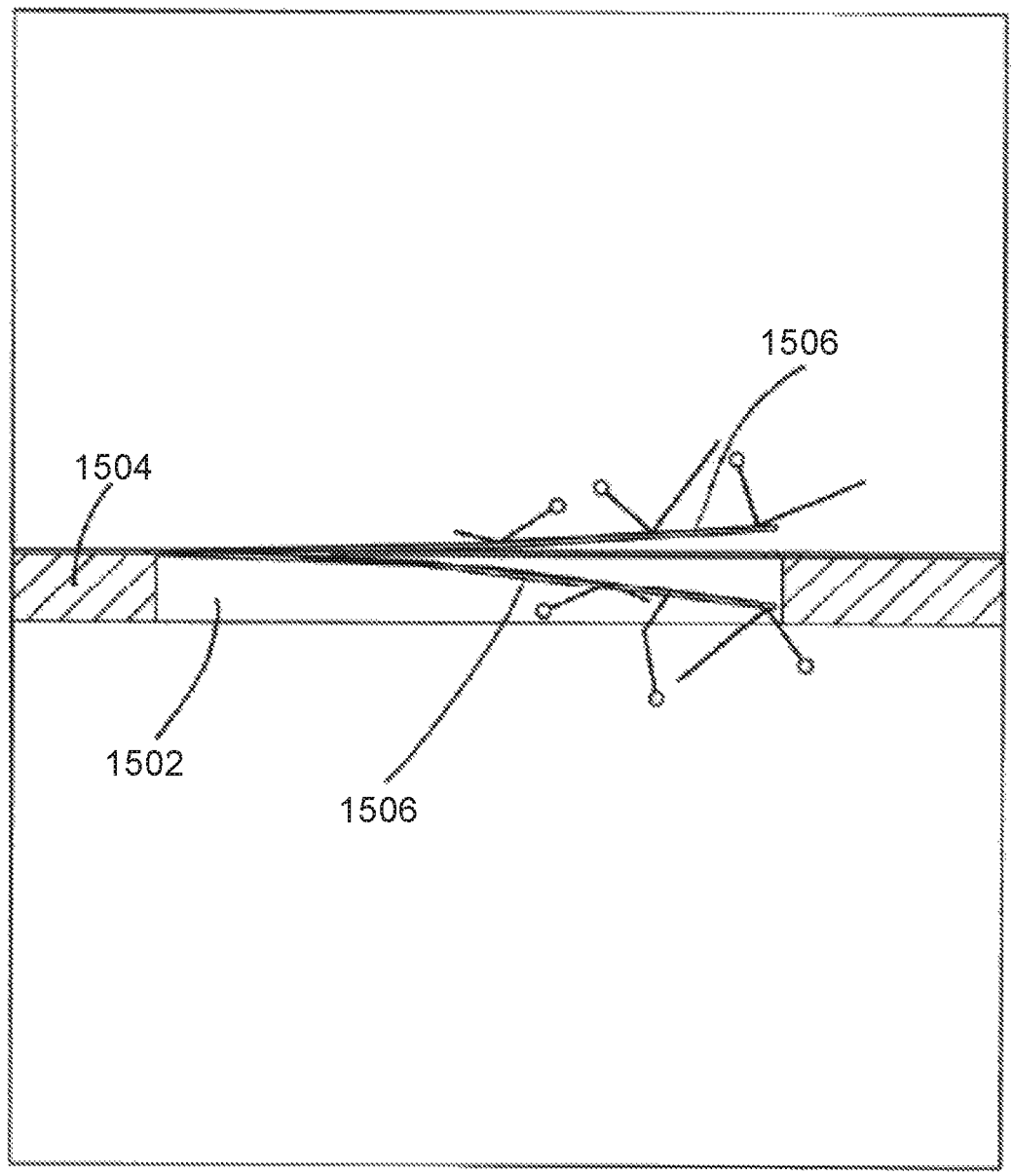

As shown in FIG. 15A, openings 1502 can be cut or carved out of a material (e.g., silicon) to form an upper plate 1504. As shown in FIG. 15B, a strip or sheet 1506 (e.g., a graphene sheet) is applied over the top of openings 1502 on upper plate 1504. Lithography can be used to define the strips 1506 as desired, and the strips can be cut (e.g., with a punch) near one side of the opening 1502 to form edge 1508, as shown in FIG. 15C. Edge 1508 is proximate protrusion 1510 on lower plate 1512. FIGS. 15D-15E depict a cross-sectional view of oscillation of beam 1506 proximate opening 1502. (FIG. 15E depicts a cross-sectional view along segment BB of FIG. 15D).

Thermal oscillations caused by collision of molecules are shown to create a larger downward movement into opening 1502 than above the opening. This asymmetrical motion will tend to pump fluid molecules down through opening 1502 and create an upward thrust on the pump assembly (e.g., on the conductive plate 1504).

A number of embodiments of the invention have been described. Nevertheless, it will be understood that various modifications may be made without departing from the spirit and scope of the invention.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, nanofilament pump assemblies can be layered or stacked (for instance, vertically) to increase output. In some embodiments, a sheet with nanofilament pump assemblies is rolled into a cylinder, and fluid is allowed to flow from a first end of the cylinder to a second end of the cylinder. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. An energy conversion system comprising a source of thermal energy and an energy conversion device that is operable to convert thermal energy from the source of thermal energy into electrical energy, wherein
   (i) the energy conversion device comprises
      (a) a first graphene vane;
      (b) a second graphene vane;
      (c) a graphene channel; and
      (d) a resistor having a first terminal and a second terminal,
   (ii) the first graphene vane is electrically connected to the graphene channel and is positioned at a first angle relative to the graphene channel,
   (iii) the second graphene vane is electrically connected to the graphene channel and is positioned (a) at a second angle relative to the graphene channel and (b) non-parallel to the first graphene vane,
   (iv) the first terminal is electrically connected to the first graphene vane,
   (v) the second terminal is electrically connected to the second graphene vane, and (vi) the resistor is operable to generate electrical charges from the thermal energy in which the electrical charges flow along the graphene channel on average in a first direction.

2. The energy conversion system of claim 1, wherein
(a) the first angle is between 10 degrees and 80 degrees relative to the graphene channel, and
(b) the second angle is between 10 degrees and 80 degrees relative to the graphene channel.

3. The energy conversion system of claim 1, wherein
(a) the first angle is between 20 degrees and 40 degrees relative to the graphene channel, and
(b) the second angle is between 20 degrees and 40 degrees relative to the graphene channel.

4. The energy conversion system of claim 1, wherein the energy conversion system comprises an array of a plurality of the energy conversion devices that are arranged in series.

5. The energy conversion system of claim 4, wherein the resistors in the plurality of the energy conversion devices arranged in series are operable to provide an average series voltage that is approximately at most 4 volts.

6. The energy conversion system of claim 1, wherein the energy conversion system comprises an array of a plurality of the energy conversion devices that are arranged in parallel.

7. The energy conversion system of claim 6, wherein the resistors in the plurality of the energy conversion devices arranged in parallel are operable to provide an average parallel voltage that is approximately at most 4 volts.

8. The energy conversion system of claim 6, wherein the array is comprised of a plurality of layers, and wherein each of the layers comprise an energy conversion device of the energy conversion devices.

9. The energy conversion system of claim 1 further comprising a substrate adjacent to the graphene channel.

10. The energy conversion system of claim 9, wherein the substrate comprises hexagonal boron nitrate.

11. The energy conversion system of claim 10, wherein the energy conversion system comprises an array of a plurality of energy conversion devices in parallel.

12. The energy conversion system of claim 10, wherein the array is comprised of a plurality of layers.

13. The energy conversion system of claim 12 wherein the layers of the plurality of layers comprise a graphene layer and hexagonal boron nitrate layer for the energy conversion device in the plurality of energy conversion devices.

14. The energy conversion system of claim 12 wherein
(a) the layers in the energy conversion device in the plurality of energy conversion devices comprise a bottom layer of hexagonal boron nitrate, a middle layer of graphene, and an upper layer of hexagonal boron nitrate, and
(b) for at least some adjacent energy conversion devices in the plurality of energy conversion devices, the bottom layer of hexagonal boron nitrate of an upper adjacent energy conversion device is the upper layer of hexagonal boron nitrate for a bottom adjacent energy conversion device.

15. The energy conversion system of claim 1, wherein mean free path of an electrical charge within the graphene is between 0.1 and 10 times of length of the first graphene vane.

16. The energy conversion system of claim 1, wherein mean free path of an electrical charge within the graphene is equal to length of the first graphene vane.

17. The energy conversion system of claim 1, wherein the energy conversion system comprises an array of a plurality of the energy conversion devices in series and parallel.

18. A device comprising the energy conversion system of claim 17, wherein the device is a smart-phone or a smart-watch.

\* \* \* \* \*